(12) United States Patent
Iyer et al.

(10) Patent No.: US 7,552,135 B2
(45) Date of Patent: Jun. 23, 2009

(54) SQL ADAPTER BUSINESS SERVICE

(75) Inventors: Arjun Chandrasekar Iyer, Belmont, CA (US); Chandrakant Ramkrishna Bhavsar, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 547 days.

(21) Appl. No.: 10/001,095

(22) Filed: Nov. 15, 2001

(65) Prior Publication Data

US 2007/0192336 A1    Aug. 16, 2007

(51) Int. Cl.
*G06F 7/00* (2006.01)
*G06F 17/30* (2006.01)
*G06F 17/00* (2006.01)
*G06F 12/00* (2006.01)

(52) U.S. Cl. .................... 707/102; 707/3; 707/203
(58) Field of Classification Search ............. 707/1–10, 707/100–104.1, 200–205; 714/4
See application file for complete search history.

(56) References Cited

U.S. PATENT DOCUMENTS

| | | | |
|---|---|---|---|
| 5,734,887 A * | 3/1998 | Kingberg et al. ............... 707/4 |
| 5,864,842 A | 1/1999 | Pederson et al. ............... 707/3 |
| 6,134,559 A * | 10/2000 | Brumme et al. ......... 707/103 R |
| 6,208,345 B1 * | 3/2001 | Sheard et al. ................ 715/853 |
| 6,356,920 B1 | 3/2002 | Vandersluis ................. 707/501 |
| 6,438,705 B1 * | 8/2002 | Chao et al. ...................... 714/4 |
| 6,446,062 B1 | 9/2002 | Levine et al. .................. 707/3 |
| 6,460,043 B1 * | 10/2002 | Tabbara et al. .............. 707/100 |
| 6,574,635 B2 * | 6/2003 | Stauber et al. .......... 707/103 R |
| 6,581,054 B1 | 6/2003 | Bogrett .......................... 707/4 |
| 6,604,097 B2 | 8/2003 | Phoenix ......................... 707/2 |
| 6,615,223 B1 * | 9/2003 | Shih et al. ................... 707/201 |
| 6,999,956 B2 * | 2/2006 | Mullins ......................... 707/2 |
| 7,275,079 B2 * | 9/2007 | Brodsky et al. ............. 709/203 |
| 7,370,272 B2 * | 5/2008 | Brodersen et al. ........... 715/210 |
| 2002/0091680 A1 * | 7/2002 | Hatzis et al. ................... 707/3 |
| 2005/0022115 A1 | 1/2005 | Baumgartner et al. ....... 715/513 |
| 2006/0122990 A1 | 6/2006 | Smith et al. .................... 707/3 |

* cited by examiner

*Primary Examiner*—Hosain T Alam
*Assistant Examiner*—Shew-Fen Lin
(74) *Attorney, Agent, or Firm*—Campbell Stephenson LLP

(57) ABSTRACT

A Structured Query Language (SQL) adapter business service that converts data from a data set to a common representation format used for all data sets with which the SQL adapter business service interacts. Hence the SQL adapter business service can communicate with various internal and external systems independently of the native format in which those systems maintain and store data. The SQL adapter business service optimizes operations to update data in the data sets by combining operations when possible and by using result sets from executing previous SQL statements to construct subsequent SQL statements. SQL adapter business service takes advantage of parent/child relationships between tables to construct SQL statements in an order such that the SQL statements process only a minimum amount of data, thereby making retrieval of data as efficient as possible.

10 Claims, 21 Drawing Sheets

Query

Construct and Execute SQL Statements

Generate and Execute SQL for Current Component

FIG. 10 Add Parent Selection Clause

Upsert Record

*Upsert Data Set*

*Check for Optimized Upsert of Child Component Instances*

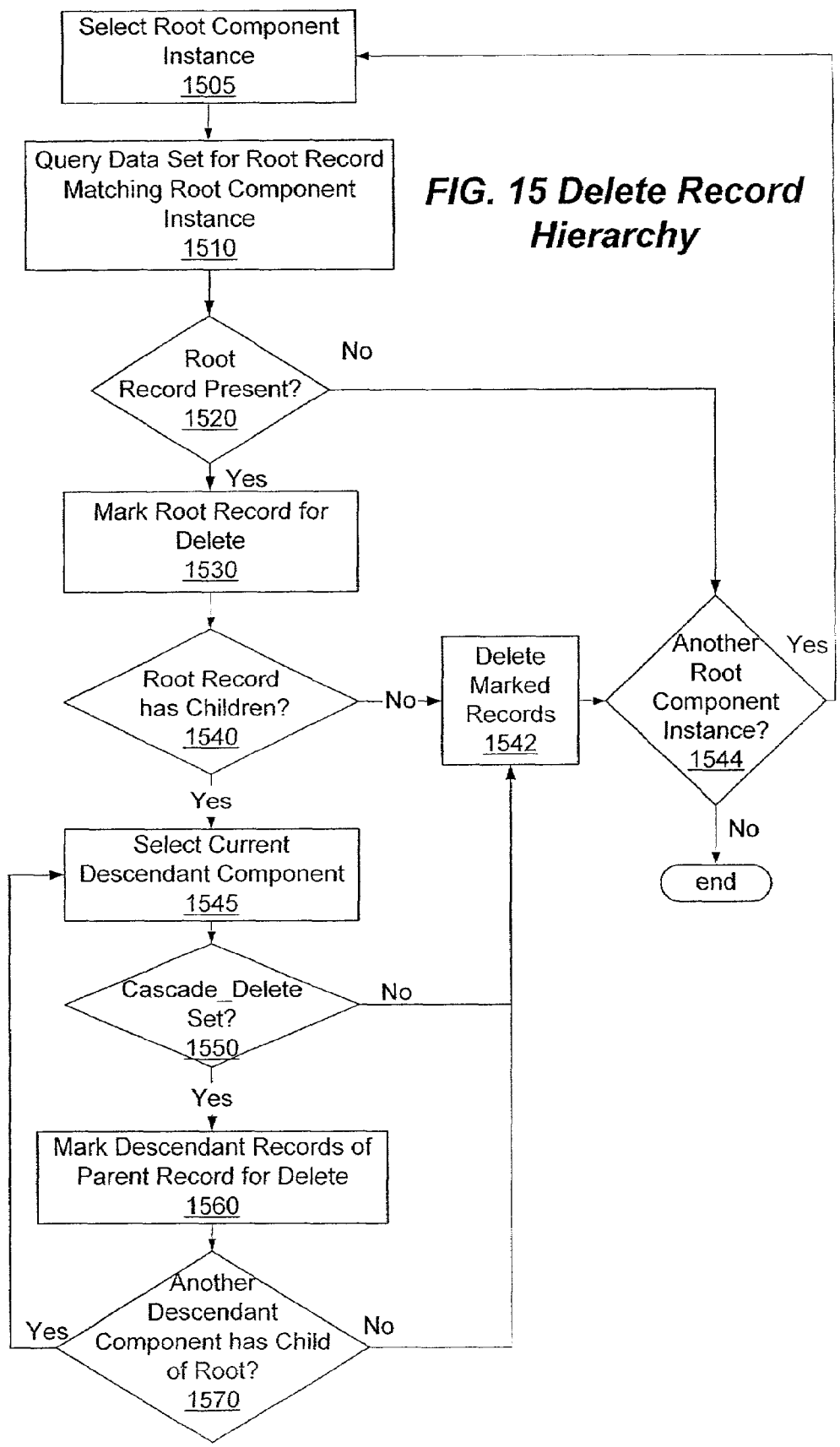
FIG. 15 Delete Record Hierarchy

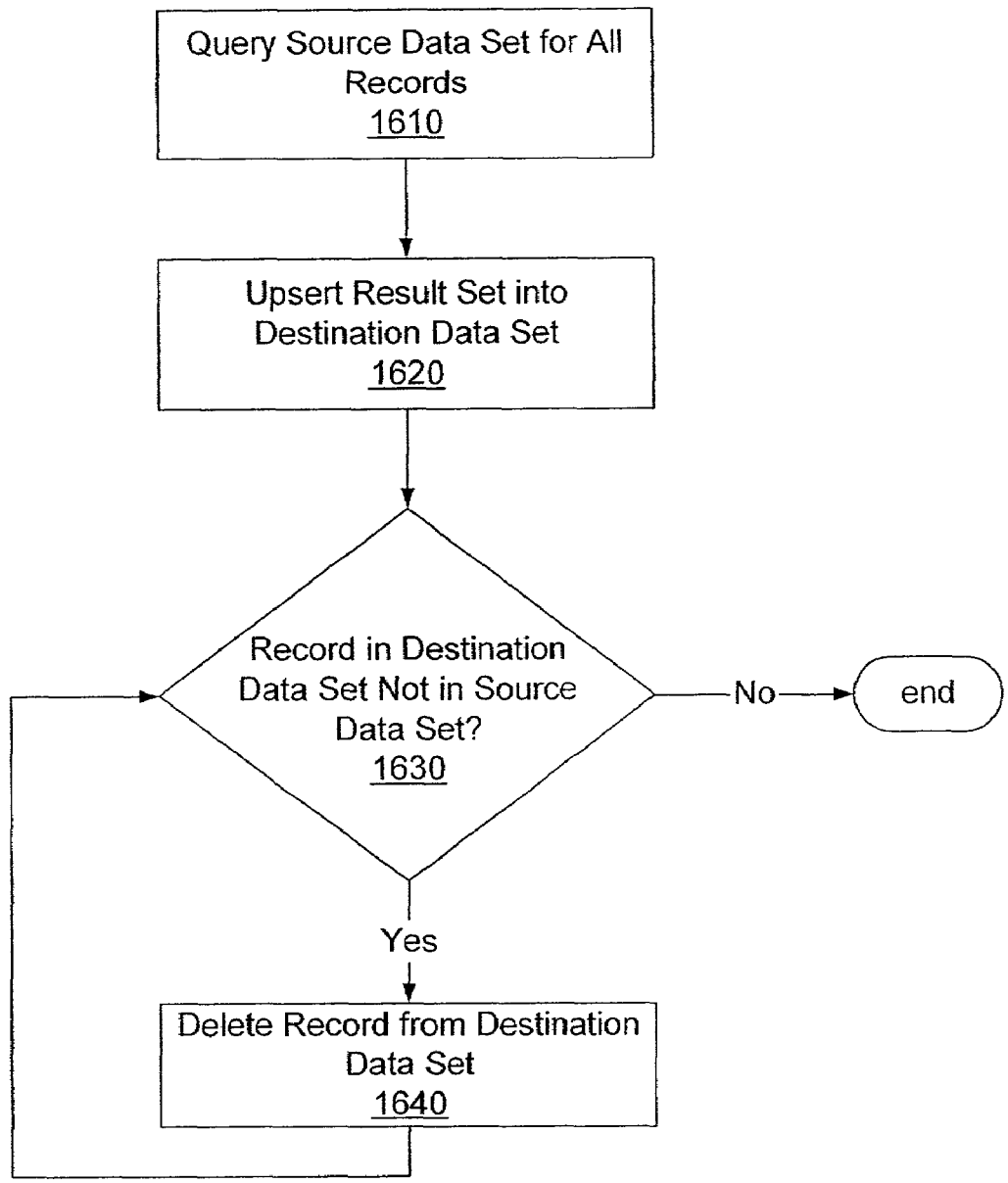
FIG. 16 Synchronize Data Sets

SQL ADAPTER BUSINESS SERVICE

BACKGROUND OF THE INVENTION

1. Field of the Invention

This invention pertains to computerized information management and processing systems generally, and more particularly to integrating business data from source and destination data sets.

2. Description of the Related Art

Often different data sets contain business data describing the same operations and/or entities but are not under the control of a single business enterprise. Rather than duplicate data collection and maintenance, sometimes it is more useful for an enterprise to obtain business data from an external data set and use it to update an internal data set, or vice versa. Some adapter software has been developed, but this adapter software is typically tailored for a particular source and destination data set and is not generally useful for finding a common data representation between other data sets.

Even when adapter software can take as input a mapping from a source data set to a destination data set and use the mapping to update the destination data set, such adapter software typically is very resource intensive. For example, updates to the destination data set are often performed one at a time, on a record-by-record basis for the various tables in the data sets. Furthermore, these updates usually do not take advantage of relationships between tables to optimize the updating process.

What is needed is an adapter that can operate for various forms of source and destination data sets. The adapter should optimize the updating process to combine operations on a data set to increase efficiency of the updating process.

SUMMARY OF THE INVENTION

The present invention provides a generic SQL adapter business service which can be used to construct and execute SQL statements on a data set, based upon a hierarchical SQL integration object definition. The SQL adapter business service communicates with various internal and external systems independently of the native format in which those systems maintain and store data. The SQL adapter business service optimizes operations to update data in the data sets by combining operations when possible and by using result sets from executing previous SQL statements to construct subsequent SQL statements. The SQL adapter business service takes advantage of parent/child relationships between tables to construct SQL statements in an order such that the SQL statements process only a minimum amount of data, thereby making processing the data as efficient as possible.

One form of the invention corresponds to a method including obtaining an operation to be performed on a data set and corresponding input data, using a SQL integration object definition to determine a structure of the data set, and constructing at least one SQL statement conforming to the structure to perform the operation on the data set according to the input data. Executing the at least one SQL statement on the data set performs the operation, and the method may include executing the at least one SQL statement.

In another form, a method includes obtaining an operation to be performed on a data set and corresponding input data, constructing at least one SQL statement to perform the operation on the data set according to the input data, and executing each SQL statement on the data set once the SQL statement is constructed. Therefore, each SQL statement is executed prior to constructing a subsequent SQL statement. The method may further include constructing the subsequent SQL statement using a result set of executing a prior SQL statement.

Yet another form of the invention corresponds to a computer system including a processor and memory. The memory includes instructions to obtain an operation to be performed on a data set and corresponding input data, use a SQL integration object definition to determine a structure of the data set, and construct at least one SQL statement conforming to the structure to perform the operation on the data set according to the input data.

In still another form, a computer system includes a processor and a memory. The memory includes instructions to obtain an operation to be performed on a data set and corresponding input data, construct at least one SQL statement to perform the operation on the data set according to the input data, and execute each SQL statement on the data set once the SQL statement is constructed. Therefore, each SQL statement is executed prior to constructing a subsequent SQL statement. The memory may further include instructions to construct the subsequent SQL statement using a result set of executing a prior SQL statement.

Yet another form of the invention corresponds to a computer program product including instructions and a computer-readable memory storing the instructions. The instructions obtain an operation to be performed on a data set and corresponding input data, use a SQL integration object definition to determine a structure of the data set, and construct at least one SQL statement conforming to the structure to perform the operation on the data set according to the input data.

In still another form, a computer program product includes instructions and a computer-readable memory storing the instructions. The instructions obtain an operation to be performed on a data set and corresponding input data, construct at least one SQL statement to perform the operation on the data set according to the input data, and execute each SQL statement on the data set once the SQL statement is constructed. Therefore, each SQL statement is executed prior to constructing a subsequent SQL statement. The instructions may further construct the subsequent SQL statement using a result set of executing a prior SQL statement.

Yet another form of the invention corresponds to a signal embodied in a carrier wave including instructions for obtaining an operation to be performed on a data set and corresponding input data, using a SQL integration object definition to determine a structure of the data set, and constructing at least one SQL statement conforming to the structure to perform the operation on the data set according to the input data. Executing the at least one SQL statement on the data set performs the operation, and the signal may include instructions for executing the at least one SQL statement.

In another form, a signal embodied in a carrier wave includes instructions for obtaining an operation to be performed on a data set and corresponding input data, constructing at least one SQL statement to perform the operation on the data set according to the input data, and executing each SQL statement on the data set once the SQL statement is constructed. Therefore, each SQL statement is executed prior to constructing a subsequent SQL statement. The signal may further include instructions for constructing the subsequent SQL statement using a result set of executing a prior SQL statement.

Still another form of the invention comprises a signal embodied in a carrier wave containing data produced by the instructions described in the previous two paragraphs.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 15 is a flowchart of the delete record hierarchy operation.

FIG. 16 is a flowchart of the synchronize data set operation.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A Structured Query Language (SQL) adapter business service is provided that converts data from a data set to a common representation format that is used for all data sets with which the SQL adapter business service interacts. Hence the SQL adapter business service can communicate with various internal and external systems independently of the native format in which those systems maintain and store data. The SQL adapter business service optimizes operations to update data in the data sets by combining operations when possible and by minimizing data that must be maintained about each data set. Furthermore, the SQL adapter business service takes advantage of parent/child relationships between tables to further optimize the updating process.

Figure 1:
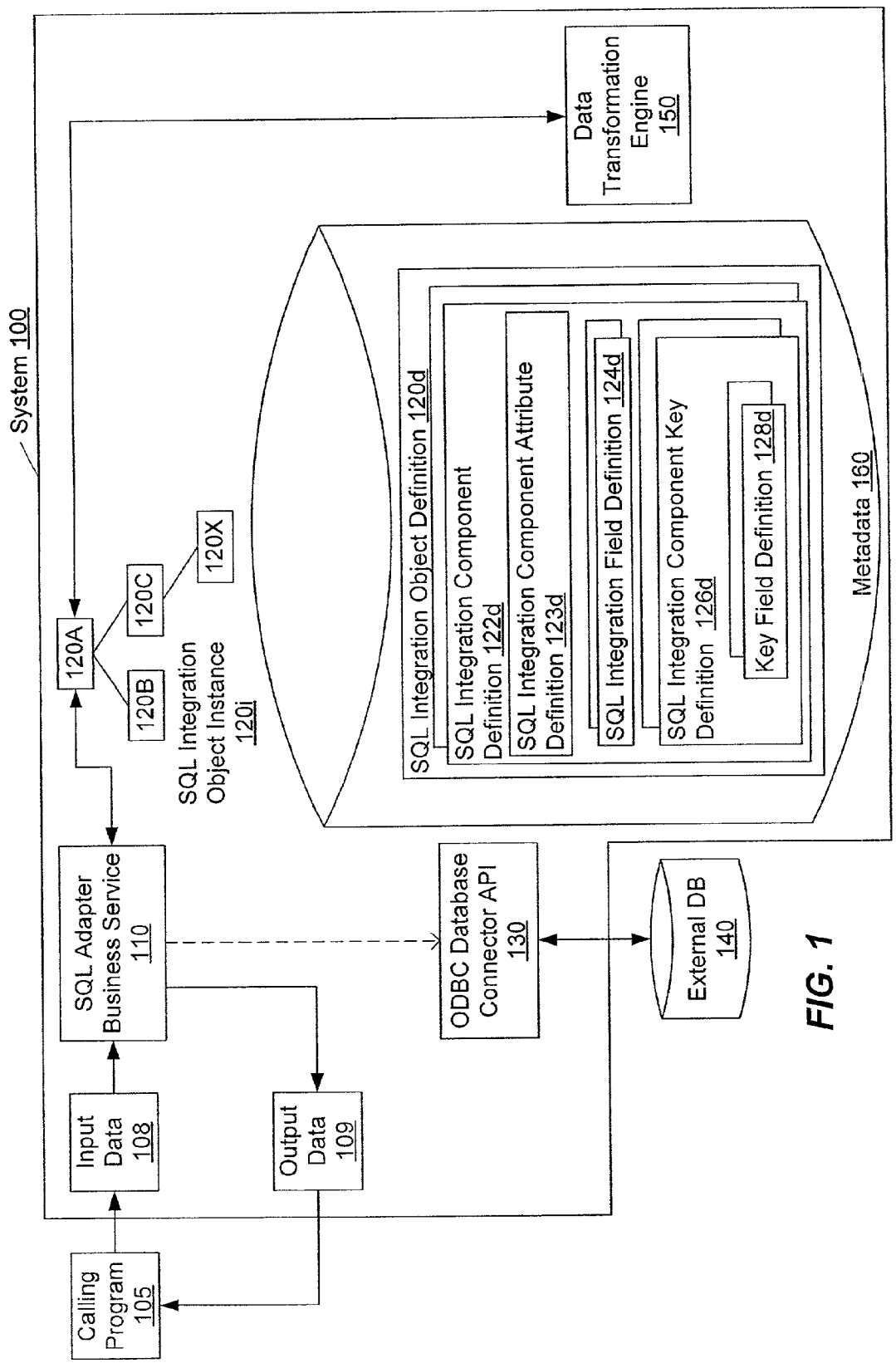
FIG. 1 is a diagram of the environment in which the SQL adapter business service operates.

FIG. 1 is a diagram of the environment in which Structured Query Language (SQL) adapter business service 110 operates. In the embodiment illustrated, system 100 includes SQL adapter business service 110, Open Database Connectivity (ODBC) database connector application programming interface (API) 130, metadata 160 which includes SQL integration object definition 120d, and data transformation engine 150. Other embodiments of system 100 may not include all of these components, and system 100 may include additional components.

Input data 108 corresponds to data that can be used to update a data set, such as rows of a database table. The term "data set" is used herein to refer to a set of data, and not to refer to a particular file name or dataset name, as files are called in some operating systems. Input data 108 may be processed and stored in memory as an object instance or an instance of some other data structure prior to input to SQL adapter business service 110, in which case the object instance or instance of the other data structure serves as input to the SQL adapter business service 110. Alternatively, input data 108 can be in the form of an unformatted byte stream such as an XML document, and SQL adapter business service 110 can include a converter element to convert the data to an internal data structure.

SQL adapter business service 110 may produce output data 109 that is returned to calling program 105. Output data 109 may also be provided as an object instance or instance of some other data structure or as an unformatted byte stream such as an XML document. For purposes of simplicity, both input data 108 and output data 109 are described herein as conforming to a common data structure.

SQL adapter business service 110 is called by calling program 105 for the purpose of performing an operation on data in one or more data sets, at least one of which can be accessed via SQL. These data sets are described herein as databases, such as external database 140, but other types of data sets that are accessible via SQL are also within the scope of the invention. Calling program 105 may be either internal or external to system 100. SQL adapter business service 110 generates one or more SQL statements for performing the requested operation on a data set such as external database 140.

SQL adapter business service 110 can be used to transfer data between a first and second data set. For example, SQL adapter business service 110 can transfer data from an external database such as external database 140 to an internal data format and/or from an internal data format to the external database. SQL adapter business service 110 may be implemented to interface directly to the internal database or SQL adapter business service 110 may instead interface to an in-memory business object layer (not shown) provided by system 100.

Metadata 160 includes an example of a SQL integration object definition, SQL integration object definition 120*d*. A SQL integration object definition such as SQL integration object definition 120*d* defines a structure to and from which data from a data set can be converted. A SQL integration object definition thus provides a common structure for data of both internal and external data sets in any format. In the embodiment shown, SQL integration object definition 120*d* defines a hierarchical structure of one or more SQL integration component definitions such as SQL integration component definition 122*d*. Each SQL integration component definition may include one or more SQL integration component attribute definition such as SQL integration component attribute definition 123*d*, one or more, SQL integration field definitions such as SQL integration field definition 124*d*, and one or more SQL integration component key definitions such as SQL integration component key definition 126*d*. Each SQL integration component key definition 126*d* may include one or more key field definition such as key field definition 128*d*.

SQL integration object instance 120*i* represents an instance of SQL integration object definition 120*d* containing data in the structure defined by SQL integration object definition 120*d*. SQL integration object instance 120*i* includes elements 120A, 120B, 120C and 120X. Input data 108 can be in the form of a Query by Example instance of SQL integration object definition 120*d*, such as SQL integration object instance 120*i*, from which SQL adapter business service 110 generates SQL statements to retrieve data from a data set such as external database 140.

For example, an Account instance may represent a specific account, such as the account for Company XYZ. All Account instances are associated with one Account integration object definition. By converting data to this common representation format, SQL adapter business service 110 can manipulate data from different systems independently of the source system and representation.

A SQL integration object definition such as SQL integration object definition 120*d* permits the development of runtime objects that are independent of specific metadata or data formats. Elements of system 100 use an internal representation for manipulating objects in memory. For purposes of illustration, the internal representation for system 100 is described as one or more SQL integration object instances such as SQL integration object instance 120*i*; however, another embodiment may include an additional converter element to convert from another internal representation to SQL integration object instances. The external representation varies according to the external application (e.g. SAP or Oracle Applications), which is represented in FIG. 1 as calling program 105. The external representation is converted to a SQL integration object definition such as SQL integration object definition 120*d*. Therefore both input data 108 and output data 109 are described herein as conforming, to the structure of a common SQL integration object definition.

Furthermore, if input data 108 comprises instances of more than one SQL integration object definition, SQL adapter business service 110 processes each subset of the input data corresponding to a different SQL integration object definition separately.

System 100 may include an element (not shown) that allows creation of a SQL integration object definition from an external metadata representation of an object. Such an element can be a wizard, in which case a separate wizard may be needed for each metadata format. Some examples of possible wizards include an eXtended Markup Language (XML) Data Type Definition (DTD) wizard; a Systeme, Anwendungen, Produkte in der Datenverarbeitung (German: Systems, Applications & Products in Data Processing) (SAP) Intermediate Document (IDOC) wizard; and a database wizard.

SQL integration object definitions and instances are further explained below with reference to FIGS. 2 through 5.

SQL integration object instance 120*i* can be input to and/or output by data transformation engine 150. Data transformation engine 150 transforms data from SQL integration object instance 120*i* to a form in which other components (not shown) of system 100 can use the data. Data transformation engine 150 can change the relationships between records, merge records, remove records, create new fields through functions on the input data fields, etc. Data transformation engine 150 may be implemented as a program driven by metadata 160. Alternatively, data transformation engine 150 may be a program specifically written for two data sets, each having its own data structure(s).

SQL adapter business service 110 can take data from a memory buffer containing a document or message and transmit it over a network protocol to external database 140. In addition, SQL adapter business service 110 can receive a message or document through the network protocol and place it in a memory buffer. Potential external protocols include Hypertext Transfer Protocol (HTTP), the operating system's file system, message queuing systems (e.g. IBM Message Queuing (MQ) Series), and Simple Mail Transfer Protocol (SMTP). Extended Markup Language (XML) documents may be transmitted to external systems as an unstructured byte stream. Alternatively, XML documents may pass through a converter, which is a software component that parses an unstructured byte buffer and creates an SQL integration object instance, or vice versa. Converters perform this parsing or generation using SQL integration object definition 120*d*. An example of a converter a program that converts between an XML Document stored as a byte buffer and SQL integration object instance 120*i*.

The embodiment of SQL adapter business service 110 shown in FIG. 1 assumes that validation of data in external database 140 is managed by an external system. Therefore, SQL integration object definition 120*d* does not include validation rules for validating data in instances such as SQL integration object instance 120*i*. However, in other embodiments, SQL adapter business service 110 may include a validation element.

SQL adapter business service 110 communicates using the interfaces, API's or protocols to exchange data with external database 140 using the native format(s) of external database 140. In one embodiment, SQL adapter business service 110 uses ODBC Database Connector API 130 to communicate with external database 140.

ODBC Database Connector API

In one embodiment, SQL adapter business service 110 uses ODBC database connector API 130 to handle database-specific issues such as cursors, database connections, etc. The ODBC database connector API is database independent and operates with numerous types of databases. In order to retrieve data from and/or write data to external database 140, SQL adapter business service 110 passes the following connection parameters via ODBC database connector API 130 to connect to external database 140:

| ODBC data source name (DSN) | Database password |
|---|---|
| Database username | Table owner |

In one embodiment, SQL adapter business service 110 relies on the calling program to pass these parameters and does not explicitly retrieve values for these parameters. SQL adapter business service 110 passes the parameters to the ODBC database connector API 130 connect method for each of its method invocations. SQL adapter business service 110 does keeps database connection handles and performs caching of database connection handles. SQL adapter business service 1120 also performs connection pooling, so that if a connection to a database already exists, it is reused.

In one embodiment, if an error occurs in external database 140, ODBC database connector API 130 reports the error to SQL adapter business service 110. Errors such as database connectivity problems, invalid table/view/column names and so on, are provided by SQL adapter business service 110 to calling program 105. In this embodiment, SQL adapter business service 110 does not attempt to interpret the semantics of these errors or to do any sort of recovery, although this functionality could be incorporated into SQL adapter business service 110. In this embodiment, the responsibility to pass the correct database parameters falls on the calling program 105 calling SQL adapter business service 110.

SQL Integration Object Definitions and Instances

Figure 2:
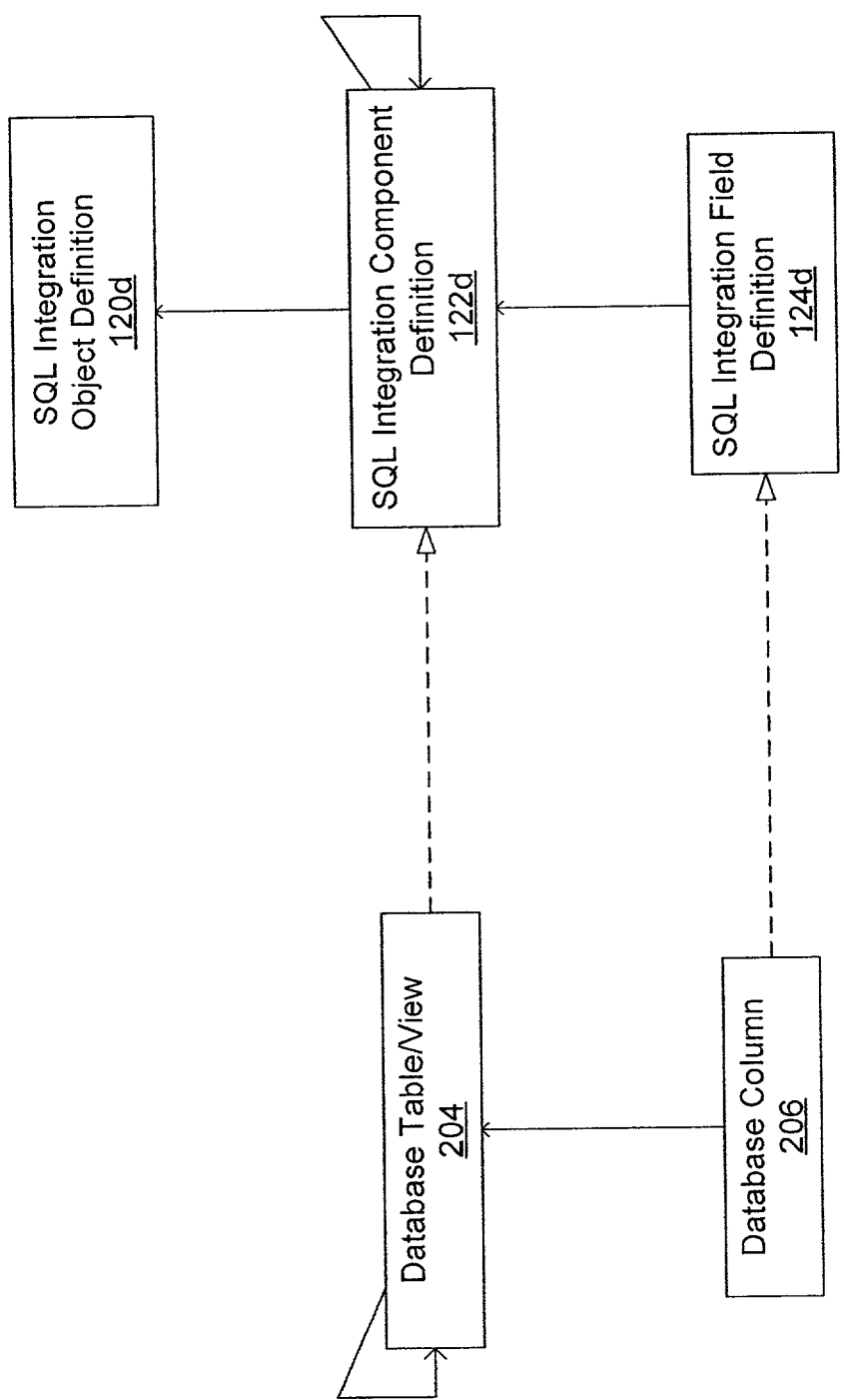
FIG. 2 is a diagram showing a mapping between database objects and a SQL integration object definition.

FIG. 2 is a diagram showing a mapping between database objects and SQL integration object definition 120d.

Input data 108 corresponds to instances of one or more database tables and/or views of a database table, labeled here as database table/view 204. An instance of database table/view 204 corresponds to a row of data in that table/view. Each database table/view may include one or more database column 206. An instance of database column 206 corresponds to a data value for a column within the row of data that is an instance of database table/view 204.

One database table/view can serve as a parent table/view to another table/view (not shown), called a child table/view, within the same hierarchy. The arrow from database table/view 204 to itself illustrates this concept.

Database table/view 204 corresponds to a SQL integration component definition such as SQL integration component definition 122d. One SQL integration component definition such as SQL integration component 122d can serve as a parent to another SQL integration component definition (not shown) within the same integration object definition 120d. Database column 230 corresponds to a SQL integration field definition such as SQL integration field definition 124d. A SQL integration object instance 120i may include a hierarchy of SQL integration component instances 122i, each of which may contain one or more SQL integration fields such as SQL integration field instance 124i.

A SQL integration field instance 126i can be a scalar data value stored in memory as a string. A SQL integration field definition such as SQL integration field definition 126d may represent textual data, a number, a date, or other scalar permitted within a SQL integration component definition such as SQL integration component definition 124d.

A SQL integration object definition such as SQL integration object definition 120d may also contain rules for forming valid SQL integration object instances 120i.

Referring to the example SQL integration object instance 120i shown in FIG. 1, each of nodes 120A, 120B, 120C and 120X corresponds to an instance of a different SQL integration component definition. This indicates that SQL integration object definition 120d includes at least four SQL integration component definitions, and that instances of four components are in the hierarchy of SQL integration object 120i.

The following paragraph introduces terminology that will be used in later examples. Node 120A corresponds to a root component of the hierarchy and is a parent component of components 120B and 120C. Components 120B and 120C are child components of the root component 120A and are sibling components. A restriction imposed by SQL adapter business service 110 is that a given component definition can have only one parent component definition in a SQL integration object definition. Component 120X is a child of component 120C, a grandchild of component 120A, and is a leaf component, indicating that component 120X has no children.

A child component at any level of the hierarchy is a descendant of its parent and of any node in the path from its parent to the root node, including the root. A parent at any node in the hierarchy is an ancestor of its child and of any node in the path between its child and a leaf level of the hierarchy. A parent component that is not the root component can be a child of another component. The root component cannot be a child component.

Figure 3:
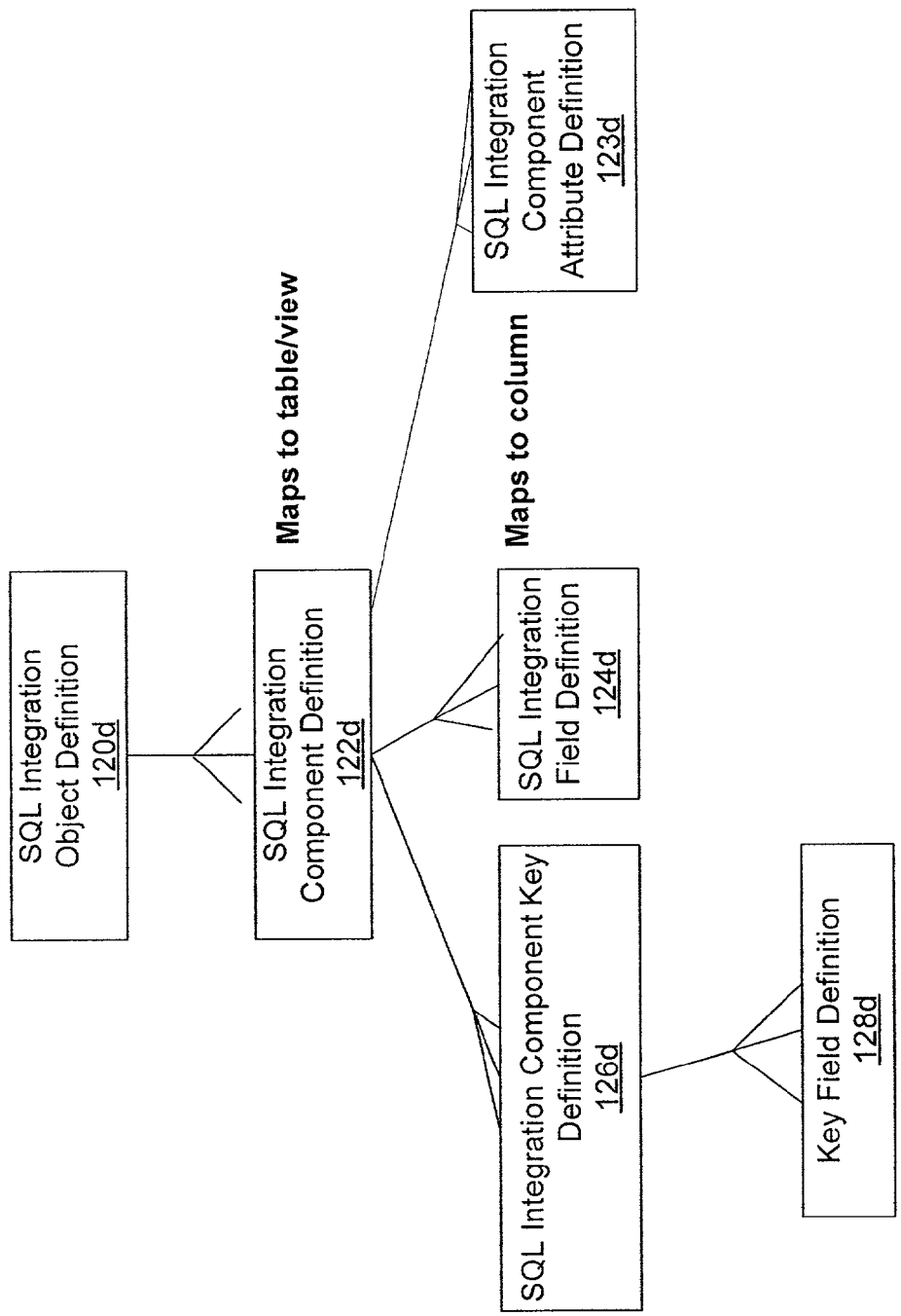
FIG. 3 is a diagram showing further detail of the structure of a SQL integration object definition.

FIG. 3 is a diagram showing further details of the structure of a SQL integration object definition.

To distinguish different SQL integration component definitions, each different SQL integration component definition such as SQL integration component definition 122d has a component type (not shown) unique to that SQL integration component definition. The component type may correspond to a table/view name corresponding to a root database table/view 204 of the hierarchy of SQL integration component definitions.

In one embodiment, a SQL integration component definition such as SQL integration component definition 122d includes additional fields related to key fields that uniquely identify data in a data set. A SQL integration component definition such as SQL integration component definition 122d may include one or more SQL integration component key definitions such as SQL integration component key definition 126d, and each SQL integration component key definition may include one or more key field definitions such as key field definition 128d to accommodate composite keys. Composite keys contain more than one database column. To accommodate composite keys, a sequence number can be included in the SQL integration component key field definition.

Each SQL integration component key definition has a key type, which may be a user key, a foreign key, or a target key. Other types of keys may also be included, such as a hierarchy parent key and a hierarchy root key; however, these key types are not used by SQL adapter business service 110 and are not discussed herein. User, foreign, and target keys are explained below.

User keys are keys consisting of a set of fields (e.g., a set of fields defined by SQL integration field definition 124d) that uniquely identifies a row in the table/view 204 corresponding to a particular SQL integration component definition. User keys are used to ascertain whether a particular row exists in a data set such as external database 140 prior to either updating or inserting data.

SQL integration component key definition incorporates the primary key/foreign key relationships that exist between the tables in a data set such as external database 140, each table being represented by a different SQL integration component definition.

In general, database tables can have foreign keys pointing to any number of other tables. For example, there may be foreign keys to a parent, ancestor, child, descendant, sibling or an arbitrarily related node. However, for a SQL integration object definition such as SQL integration object definition 120d, foreign keys are used to represent parent/child relationships between SQL integration component definitions only. Other types of foreign keys are not represented.

A target key corresponds to a primary key for the external table/view corresponding to its respective SQL integration component definition. A target key can be considered to be a primary key for the parent table of a parent/child relationship. A target key's values are included as values of a foreign key in its child instance, which is an instance of its respective SQL integration component definition.

Parent/child relationships are ascertained via the target key and foreign key definitions. A SQL integration component definition can have multiple target and user keys but can have only one foreign key defined, as a particular SQL integration component definition can have only one parent.

Figure 4:
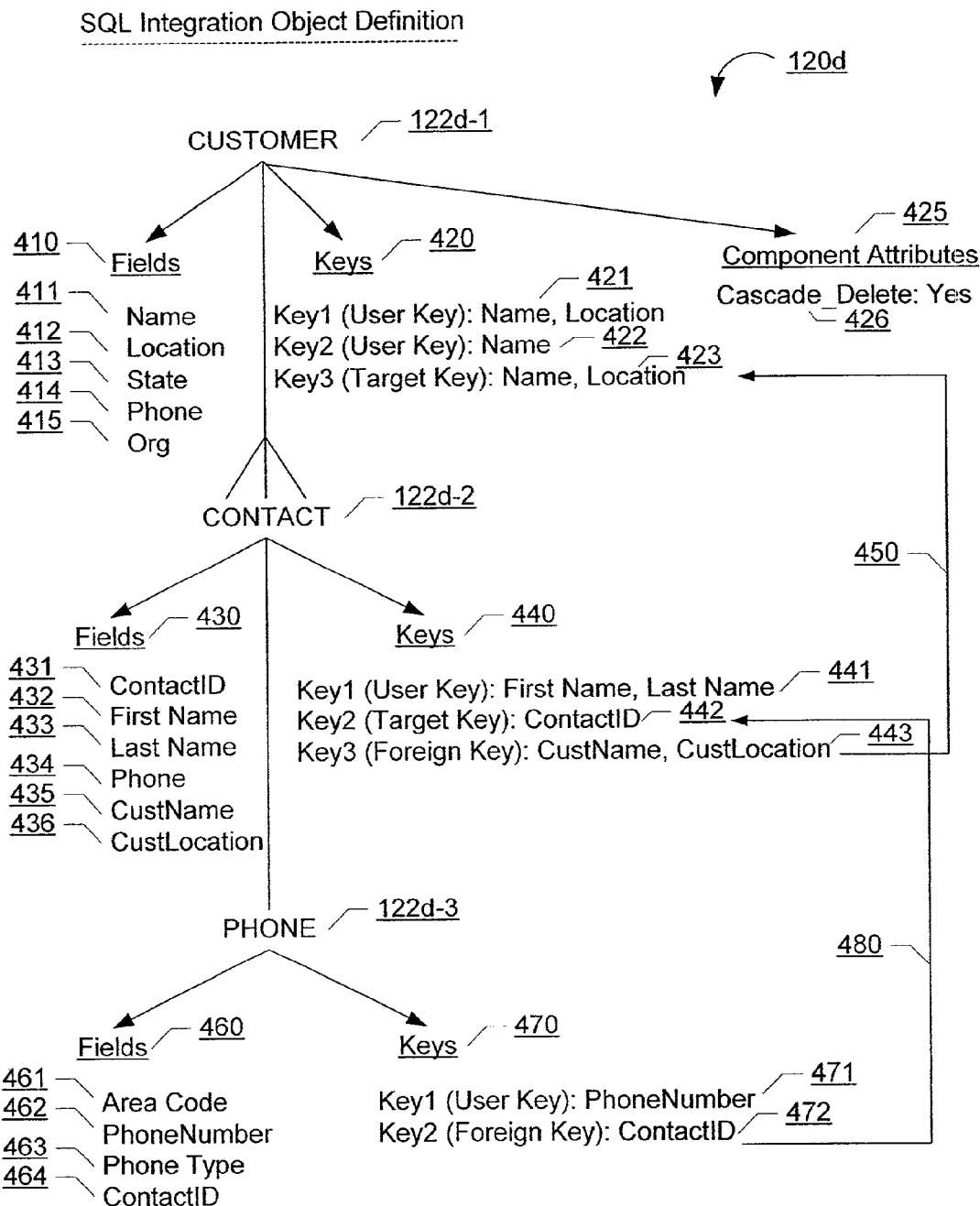
FIG. 4 is an example of a SQL integration object definition.

FIG. 4 shows an example of a SQL integration object definition. Three SQL integration component definitions are included: CUSTOMER 122d-1, CONTACT 122d-2, and PHONE 122d-3. Each of these SQL integration component definitions corresponds to a table/view in a database. CUSTOMER 122d-1 is the root component of the hierarchy of SQL integration component definitions.

Each SQL integration component definition includes SQL integration field definitions and SQL component key definitions. SQL integration component definition CUSTOMER 122d-1 includes SQL integration field definitions 410, which defines fields Name 411, Location 412, State 413, Phone 414, and Organization (abbreviated Org) 415. SQL integration component definition CUSTOMER 122d-1 includes SQL component key definitions 420, which defines Key1 421, Key2 422, and Key3 423. Key1 is a user key comprising the Name 411 and Location 412 fields. Key2 is a user key comprising the Name 411 field. Key3 is a target key comprising the Name 411 and Location 412 fields, indicating that the CUSTOMER table is a parent table in a parent/child relationship.

SQL integration component definition CUSTOMER 122d-1 also includes SQL integration component attribute definition 425, which defines a Cascade_Delete attribute 426 with a value of yes. Cascade_Delete attribute 426 with a value of yes means that when a record is deleted from the CUSTOMER table, records in the child table are also deleted.

Similarly, SQL integration component definition CONTACT 122d-2 includes SQL integration field definition 430, which defines fields ContactID 431, First Name 432, Last Name 433, Phone 434, Customer Name (abbreviated CustName) 435, and Customer Location (abbreviated CustLocation) 436. SQL integration component definition CUSTOMER 122d-1 includes SQL component key definitions 440, which defines Key1 441, Key2 442, and Key3 443. Key1 441 is a user key comprising the First Name 432 and Last Name 433 fields. Key2 is a target key comprising the ContactID 431 field. Key2 442 indicates that the CONTACT table is a parent to another table in a parent/child relationship. Key3 443 is a foreign key comprising the Customer Name 435 and Customer Location 436 fields. Key3 443 indicates that the CONTACT table is a child in a parent/child relationship.

The CONTACT table is a child to the CUSTOMER table defined in SQL integration component definition 122d-1. This parent/child relationship is shown by arrow 450 from Key3 443 filed in the CONTACT component definition 122d-2 to the Key3 423 field in the CUSTOMER component definition 122d-1. The values of foreign Key3 443 in a row of the CONTACT table match the values of target Key3 423 in its parent row of the CUSTOMER table.

In the last SQL integration component definition, SQL integration component definition PHONE 122d-3 includes SQL integration field definition 460, which defines fields Area Code 461, Phone Number 462, Phone Type 463, and ContactID 464. SQL integration component definition PHONE 122d-3 also includes SQL component key definitions 470, which defines Key1 471 and Key2 472. Key1 is a user key comprising the Phone Number 462 field. Key2 is a foreign key comprising the ContactID 464 field. Key2 indicates that the PHONE table is a child to the CONTACT table in a parent/child relationship. As shown by arrow 480 from Key2 472 in the PHONE component definition 122d-3 to Key2 442 of the CONTACT component definition, the values of foreign Key2 472 in a row of the PHONE table match the values of target Key2 442 in its parent row of the CONTACT table.

Note that the name of the SQL integration component to which a foreign key points is implicit by virtue of being included within the same hierarchy defined by SQL integration object definition 120d.

Figure 5:
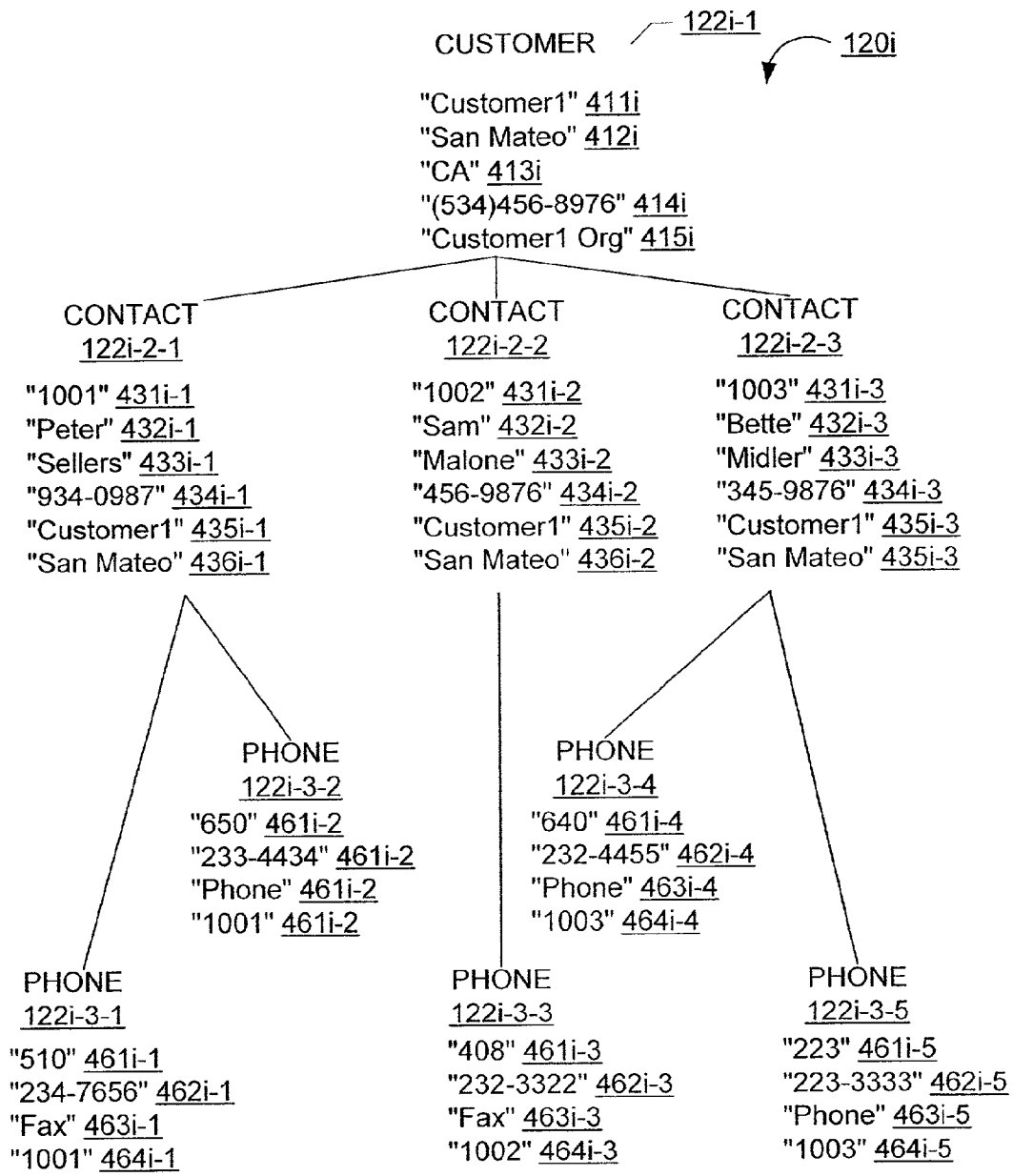
FIG. 5 is an example of a SQL integration object instance according to the SQL integration object definition of FIG. 4.

FIG. 5 is an example of SQL integration object instance 120i, which corresponds to SQL integration object definition 120d of FIG. 4. One row of the CUSTOMER table is shown, with three children records in the CONTACT table and five grandchildren records in the PHONE table.

SQL integration component instance 122i-1 has corresponding values for each field of the SQL integration component definition. Field Name 411 has value "Customer1", labeled 411i; Location 412 has value "San Mateo", labeled 412i; State 413 has value "CA", labeled 413i; Phone 414 has value "(534)456-8976", labeled 414i; and Organization 415 has value "Customer1 Org", labeled 415i.

Three contact records are children of the CUSTOMER instance 122i-1, CONTACT 122i-2-1, 122i-2-2, and 122i-2-3. The first instance CONTACT 122i-2-1 has values ContactID 431i-1 field of "1001"; First Name 432i-1 of "Peter"; Last Name 433i-1 of "Sellers"; Phone 434i-1 of "934-9087"; Customer Name 435i-1 of "Customer1"; and Customer Location 436i-1 of "San Mateo". The second instance CONTACT 122i-2-2 has values ContactID 431i-2 field of "1002"; First Name 432i-2 of "Sam"; Last Name 433i-2 of "Malone"; Phone 434i-2 of "456-9876"; Customer Name 435i-2 of "Customer1"; and Customer Location 436i-2 of "San Mateo". The third instance CONTACT 122i-2-3 has values ContactID 431i-3 field of "1003"; First Name 432i-3 of "Bette"; Last Name 433i-3 of "Midler"; Phone 434i-3 of "345-9876"; Customer Name 435i-3 of "Customer1"; and Customer Location 436i-3 of "San Mateo". Note that, for each record, the value of Customer Name and Customer Location (the foreign key Key3 443) match the values of Name and Location in the parent instance CUSTOMER 122i-1 (the target key Key3 423).

Two phone records are children of the CONTACT instance 122i-2-1, PHONE instances 122i-3-1 and 122i-3-2. One phone record is a child of the CONTACT instance 122i-2-2, PHONE instances 122*i*-3-3. Two phone records are children of the CONTACT instance 122*i*-2-3, PHONE instances 122*i*-3-4 and 122*i*-3-5.

The first instance PHONE 122*i*-3-1 has values Area Code 461*i*-1 of "510", Phone Number 462*i*-1 of "234-7656", Phone Type 463*i*-1 of "Fax", and ContactID 464*i*-1 of "1001". The second instance PHONE 122*i*-3-2 has values Area Code 461*i*-2 of "650", Phone Number 462*i*-2 of "233-4434", Phone Type 463*i*-2 of "Phone", and ContactID 464*i*-2 of "1001". Note that the ContactID 464 value of these two records, "1001", matches the value of ContactID 431 in their parent record.

The third instance PHONE 122*i*-3-3 has values Area Code 461*i*-3 of "408", Phone Number 462*i*-3 of "232-3322", Phone Type 463*i*-3 of "Fax", and ContactID 464*i*-3 of "1002". The ContactID 464 value "1002" of this instance matches the ContactID 431 value of its parent.

The fourth instance PHONE 122*i*-3-4 has values Area Code 461*i*-4 of "640", Phone Number 462*i*-4 of "232-4455", Phone Type 463*i*-4 of "Phone", and ContactID 464*i*-4 of "1003". The fifth instance PHONE 122*i*-3-5 has values Area Code 461*i*-5 of "223", Phone Number 462*i*-5 of "232-3322", Phone Type 463*i*-5 of "Phone", and ContactID 464*i*-5 of "1003". Note that the ContactID 464 value of these two records, "1003", matches the value of ContactID 431 in their parent record.

Figure 6:
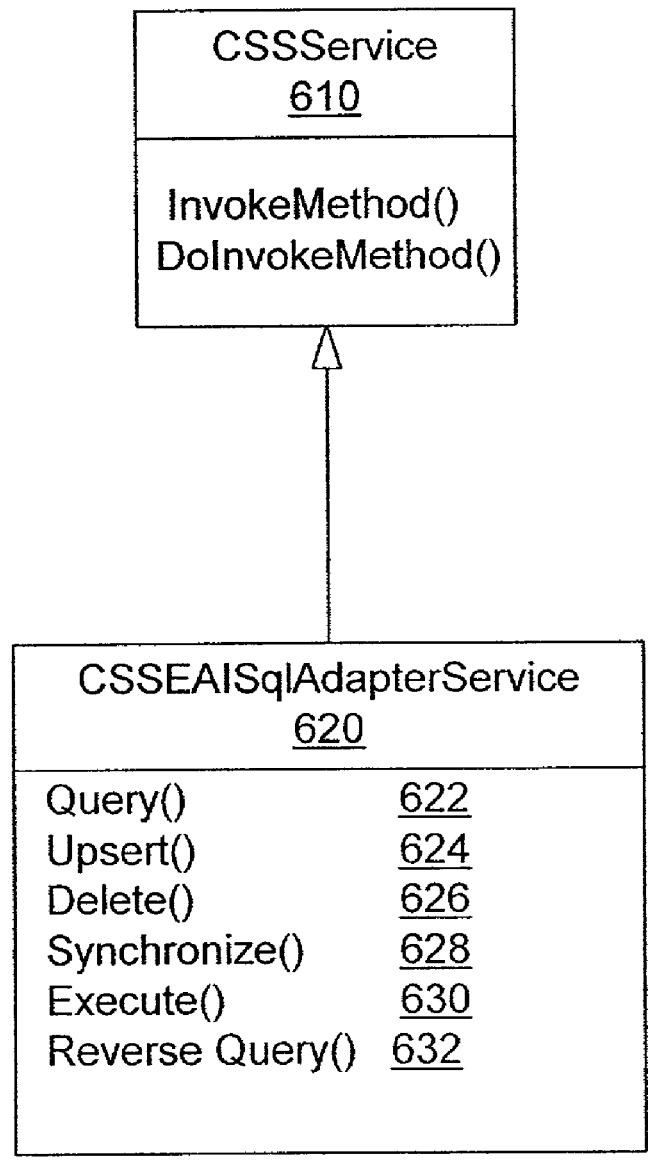
FIG. 6 is a class diagram of the Service class and the SQL Adapter Service class corresponding to the SQL adapter business service of FIG. 1.

FIG. 6 is a class diagram of Service class 610 and the SQL Adapter Service class 620 corresponding to SQL adapter business service 110.

Methods provided by SQL adapter business service 110 include query method 622, upsert method 624, delete method 626, synchronize method 628, execute method 630 and reverse query method 632. Each of these methods takes as input one or more instance of one SQL integration object definition. For input data sets in which data representing multiple SQL integration object definitions are present, a SQL adapter business service 110 method is called once for data for each SQL integration object definition.

Some arguments are globally accessible for all methods. For example, a MaxCursorCacheSize parameter is globally accessible for all methods. SQL adapter business service 110 uses ODBC Database Connector API 130 to access external database 140, and ODBC Database Connector API 130 provides for cursor caching. The maximum cursor cache size can be set using the MaxCursorCacheSize parameter for each of the methods of SQL adapter business service 110. In one embodiment, the default cursor cache size is set to 50 cursors.

Each of these methods will be described with reference to FIGS. 1 and 2.

Query Method

In one embodiment, query method 622 accepts input data 108 in the form of a hierarchical QBE (Query By Example) instance such as SQL integration object instance 120*i*. The QBE instance may include, for example, a field value uniquely identifying a record of a table corresponding to a SQL integration component definition of the SQL integration object definition corresponding to the SQL integration object instance. Such a field value is referred to herein as a search specification. Alternatively, the QBE instance may include no data values, in which case query method 622 queries for all data corresponding to the SQL integration object definition.

In other embodiments, input data 108 can be in other forms, and SQL adapter business service 110 or another converter module may convert input data 108 to one or more QBE instances. In addition, for purposes of simplicity, input data 108 is described herein as a set of QBE instances of one SQL integration object definition such as SQL integration object definition 120*d*. However, input data 108 may include data that corresponds to different SQL integration object definitions. Query method 622 may process data for each SQL integration object definition separately according to the flowcharts described in FIGS. 7-10 herein.

Query method 622 returns output data 109 in the form of one or more SQL integration object instances 120*i*. A search specification for data to be included in output data 109 can be specified at any level of the hierarchy of the QBE instance. For example, a search specification may include a unique identifier for a root SQL integration component instance 122*i* sitting at the root of the hierarchy of the QBE instance, such as root node 120A of FIG. 1. If calling program 105 does not specify a search specification, query method 622 will retrieve all rows from the database table/view 204 corresponding to the root SQL integration component definition and all rows of children tables defined as part of the SQL integration object definition corresponding to the SQL integration object definition for the QBE instance.

In the following discussion, the following terminology is used. The term "SQL integration component definition" is sometimes referred to as "component definition" or simply "component." Similarly, the term "SQL integration component instance" is referred to as "component instance" or "instance" of a corresponding SQL integration component definition that is clear from the context.

Figure 7:
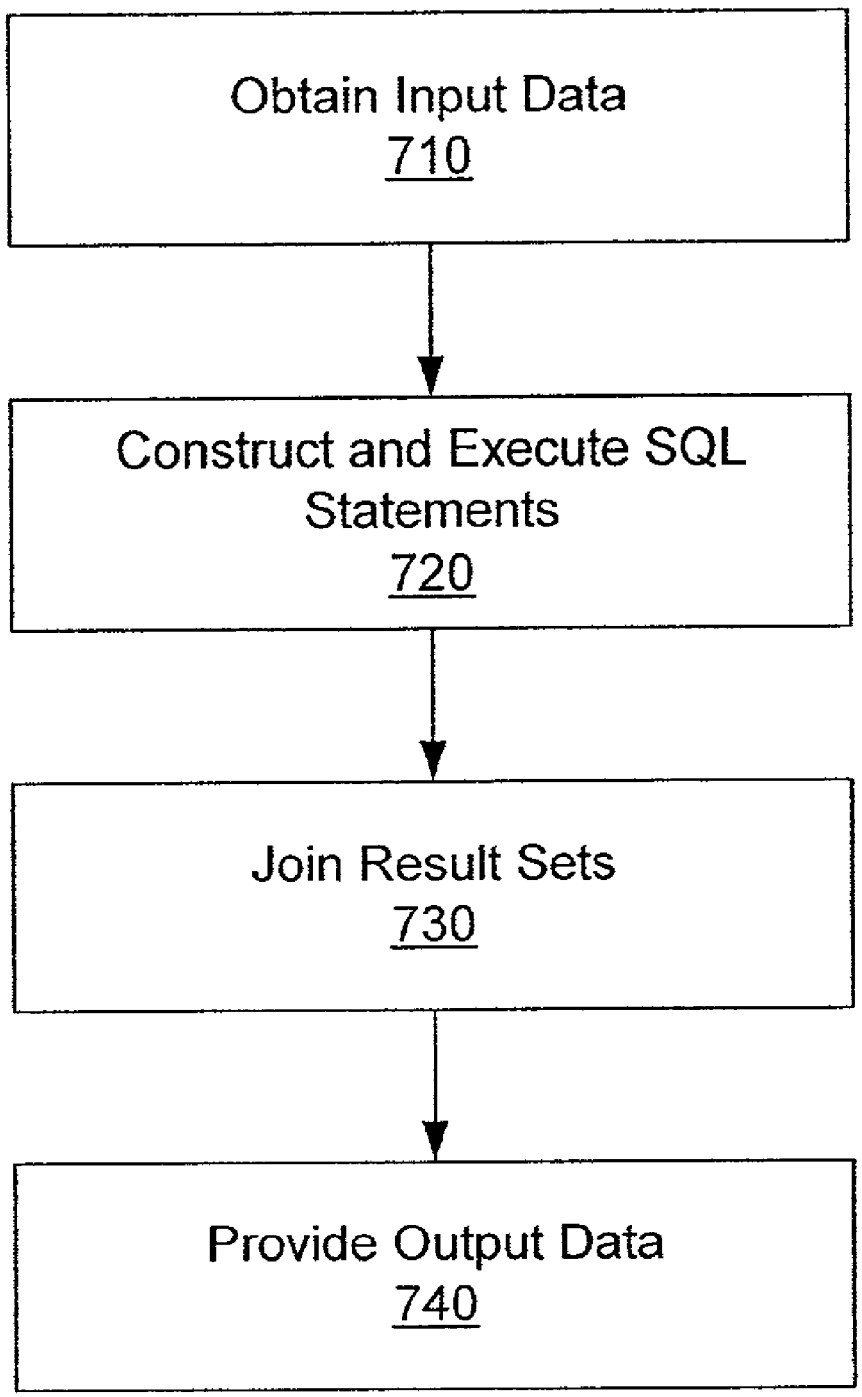
FIG. 7 is a flowchart of the query operation performed by the SQL adapter business service.

FIG. 7 shows a flowchart of the query method. In Obtain Input Data step 710, SQL adapter business service 110 takes the Query By Example (QBE) instance and determines the search specification corresponding to each component in SQL integration object definition 120*d*. A search specification is also referred to herein as a "search spec." SQL adapter business service 110 processes one SQL integration object definition at a time, and each SQL integration object instance may include instances of multiple SQL integration component definitions.

In Construct and Execute SQL Statements step 720, SQL statements to retrieve data corresponding to the search specification for each component are constructed and executed. Construct and Execute SQL Statements step 720 is further explained with reference to FIGS. 8, 9 and 10. Join Result Sets step 730 joins the results of the execution of each SQL statement to produce output data 109. In Provide Output Data step 740, output data 109 is provided. In one embodiment, output data 109 is provided in the form of SQL integration object instances. It is contemplated that, in some embodiments, a subset of output data 109 may be provided.

Query method 622 can be optimized by setting a parameter called MaxSqlClauses, which can be set to any integer greater than or equal to one (1). In one embodiment, the default value of MaxSqlClauses is 100. The MaxSqlClauses parameter is used to limit the number of parent SQL integration component instances 122*i* that the SQL adapter business service 110 groups (combines using OR) in creating a SQL statement. If MaxSqlClauses parameter has a value of one (1), then SQL adapter business service 110 executes one query to retrieve each parent SQL integration component instance 122*i* to be included in output data 109. The MaxSqlClauses parameter may be used to limit the number of data values that are combined using OR for a particular data field as well.

The MaxSqlClauses parameter is useful in restricting the length of the SQL statements, which have an upper limit imposed by ODBC specifications. According to the Microsoft Developer's Network Library ODBC Programming Reference (January 2001), a limit of 65K characters may be used. Note that, the higher the value of the MaxSql- Clauses parameter, the more efficient is the execution of query method 622, as fewer SQL statements need to be executed.

Query method 622 can be controlled by another method argument called TemplateQuery. By default one or more SQL integration object instance 120*i*, with instances for every component in the entire hierarchy, including sibling components, are returned as part of output data 109. If the TemplateQuery parameter is not set, SQL adapter business service 110 descends the entire hierarchy and includes output data from each level of the hierarchy defined in SQL integration object definition 120*d*.

If the TemplateQuery parameter is set, SQL adapter business service 110 restricts the output hierarchy to the components specified in the QBE instance. For example, if input data 108 only consists of a root SQL integration component instance, output data 109 consists of one or more SQL integration component instance 122*i* for only the root component.

Figure 8:
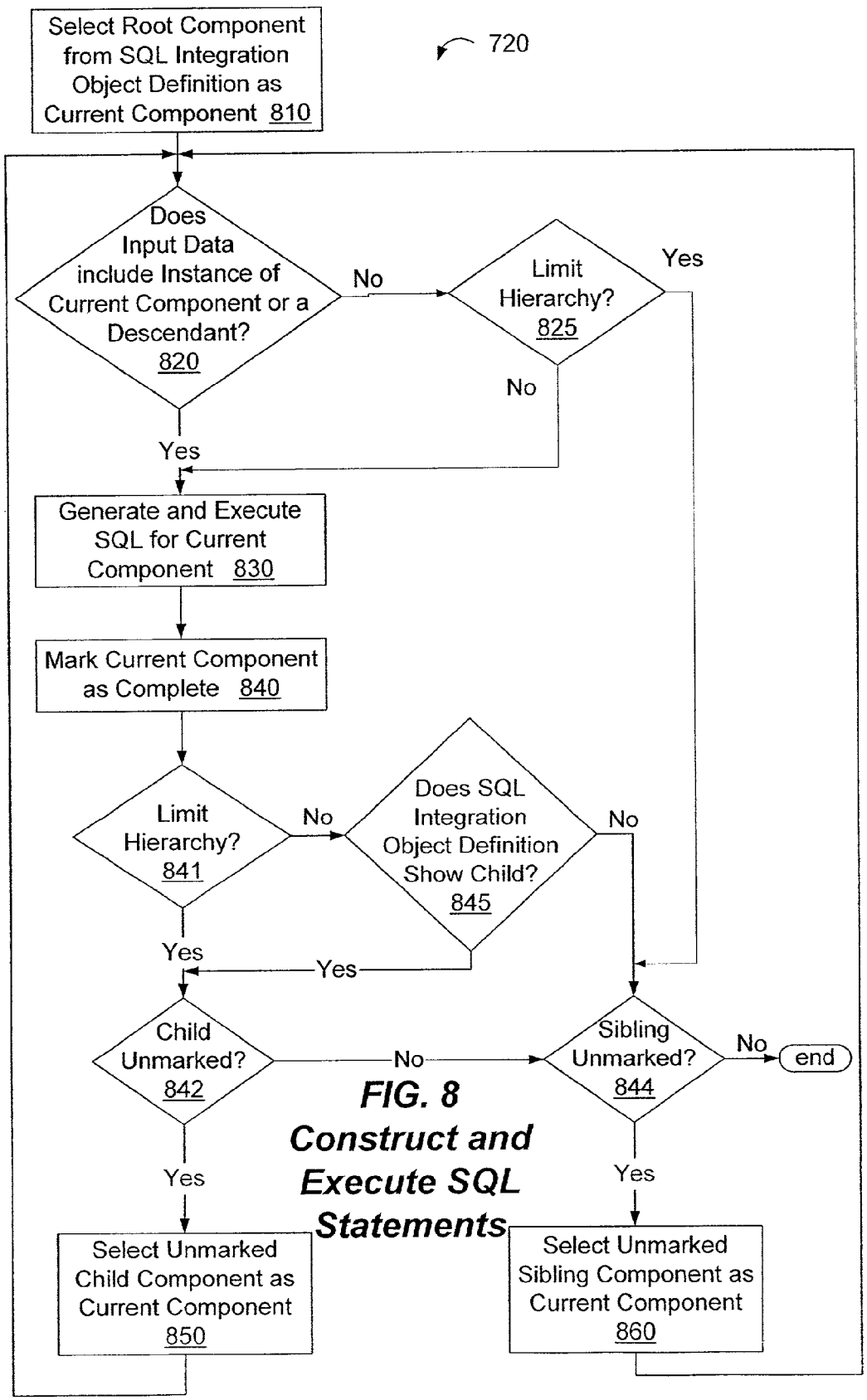
FIG. 8 is a flowchart of the Construct and Execute SQL Statements step of FIG. 7.

FIG. 8 is a flowchart of the Construct and Execute SQL Statements step 720 of FIG. 7.

Constructing SQL statements for a query operation begins at the root component of a SQL integration object definition. As described above, SQL adapter business service 110 processes one SQL integration object definition at a time; i.e., input data 108 is provided as instances of one SQL integration object definition and SQL adapter business service 110 may be invoked multiple times to process all input data 108. The entire SQL integration object definition 120*d* is traversed starting at the root component definition, and a complete hierarchy of SQL integration object instances is returned as part of output data 109. If the input data does not include a parent component instance, but does include a descendant component instance, a SQL statement must be constructed for the parent component as well.

In Select Root Component from SQL Integration Object Definition as Current Component step 810, the root component is selected. In Does Input Data Include Instance of Current Component or a Descendant decision point 820, the input data is examined to determine whether it includes an instance of the SQL integration component definition for the currently selected component. If not, the input data is also examined for descendant component instances of descendants of the current component definition (children, grandchildren, and so on).

If no instance of the current component or a descendant appears in the input data, control proceeds to limit hierarchy decision point 825. If an instance of the current component or a descendant appears in the input data, control proceeds to Generate and Execute SQL for Current Component step 830.

In Generate and Execute SQL for Current Component step 830, SQL statements to retrieve records meeting the search specification criteria for the current component are generated and executed. In the preferred embodiment, each SQL statement is executed when it is generated, because the result set of the previous SQL statement can be used to construct a subsequent SQL statement. Generate and Execute SQL for Current Component step 830 is discussed further with respect to FIGS. 9 and 10. Control proceeds to Mark Current Component as Complete step 840, where the current component is marked as complete. Because generation and execution of SQL statements begins with the root component of the SQL integration object definition 120*d* and traverses children and then sibling components, a component is marked to indicate that SQL has been generated for that component. Only unmarked components are selected for generation and execution of SQL statements, so that no SQL statements are generated when the traversal encounters the component definition again. Other embodiments may include an alternative mechanism to marking to ensure that SQL statements are not generated when a SQL integration component definition is encountered a second time during the traversal of the SQL integration object definition.

Control proceeds from Mark Current Component as Complete step 840 to Limit Hierarchy decision point 841. The purpose of the limit hierarchy decision points is to determine whether a parameter is set to limit the output hierarchy to only those components for which instances appear in the input data. Limit Hierarchy decision points are optional and correspond to implementations in which the Template Query parameter, described above, is used. If the Limit Hierarchy parameter is set, only components for which instances appear in the input data, and ancestors of those components, are included in output data 109. Control proceeds to Child Unmarked decision point 842.

From Limit Hierarchy decision point 841 when the Limit Hierarchy parameter is net set, or in an implementation where the output data hierarchy is not limited, control proceeds to Does SQL Integration Object Definition Show Child decision point 845. By default, an entire hierarchy corresponding to the input data with instances of all components included in the input SQL integration object definition are included in output data 109. If a child exists in the SQL integration object definition, control proceeds to Child Unmarked decision point 842. If no child exists in the SQL integration object definition, control proceeds to Sibling Unmarked decision point 844.

In Child Unmarked decision point 844, a determination is made whether an unmarked child component exists. As described above, a component is marked as complete in Mark Current Component as Complete step 840 after SQL for the current component is generated and executed. If an unmarked child exists, then additional SQL needs to be generated for the unmarked child component and control proceeds to Select Unmarked Child Component as Current Component step 850. If no unmarked child exists at Child Unmarked decision point 842, control proceeds to Sibling Unmarked decision point 844.

In Select Unmarked Child Component as Current Component step 850, the unmarked child component is selected as the current component. Control proceeds to Does Input Data include Instance of Current Component or a Descendant decision point 820 to process the newly selected current component.

In Sibling Unmarked decision point 842, a determination is made whether an unmarked sibling component exists. If so, control proceeds to Select Unmarked Sibling Component as Current Component step 860. Control proceeds to Does Input Data include Instance of Current Component or a Descendant decision point 820 to process the newly selected current component.

If no unmarked sibling component exists in Sibling Unmarked decision point 842, generation and execution of SQL statements for all components of the SQL integration object definition corresponding to the input data is complete. Construct and Execute SQL Statements step 720 of FIG. 7 is complete and control proceeds to Join Results Set step 730.

If, in Does Input Data include Instance of Current Component or a Descendant decision point 820, the input data does not include an instance, control proceeds to limit hierarchy decision point 825. If the hierarchy is not limited, control proceeds to Generate and Execute SQL for Current Component step 830. An entire hierarchy corresponding to the input data with instances of all components included in the input SQL integration object definition are included in output data 109. If, in Limit Hierarchy decision point 825, the hierarchy is limited, control proceeds to Sibling Unmarked decision point 844, because no SQL statement is needed for the current component.

Figure 9:
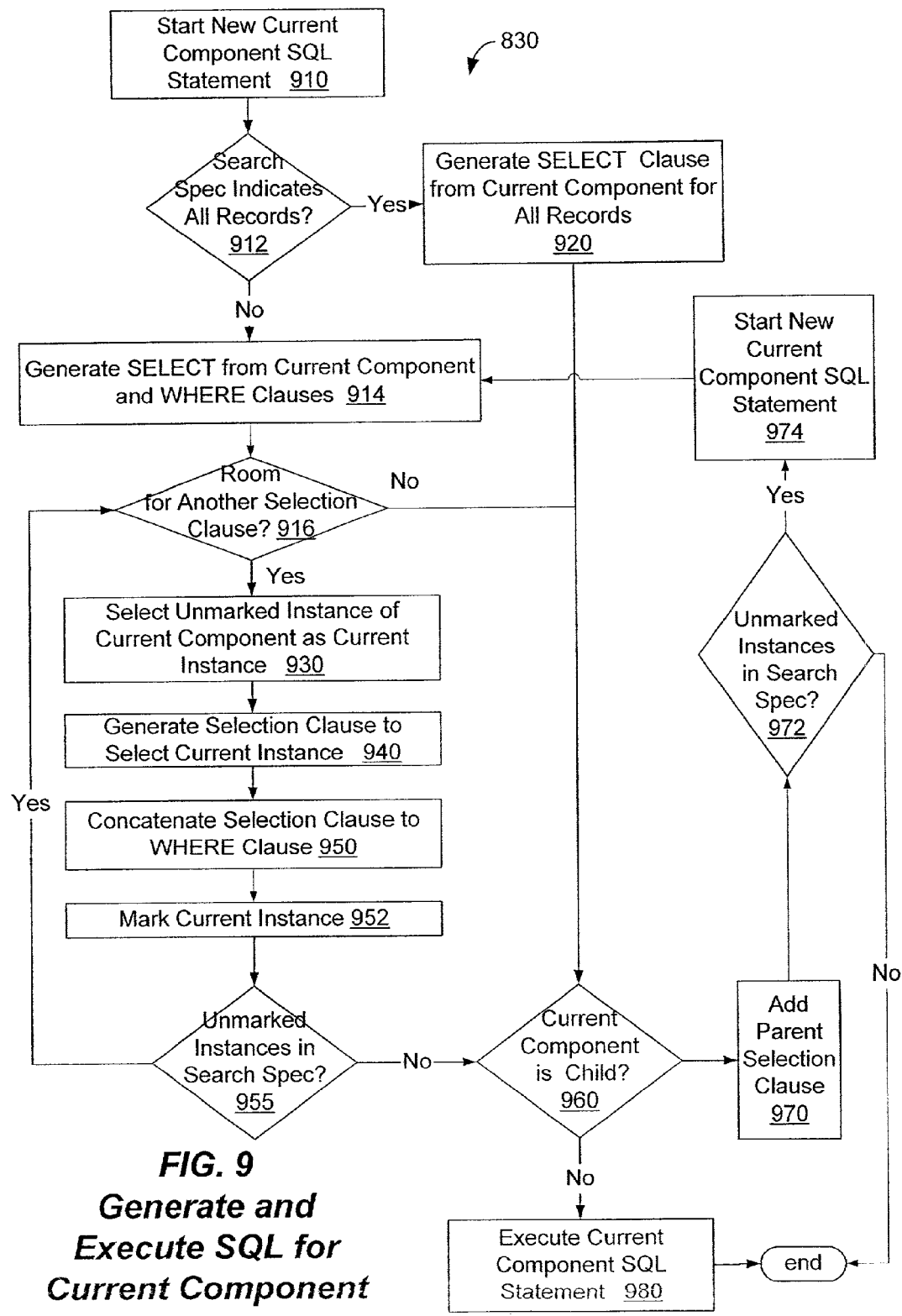
FIG. 9 is a flowchart of the Generate and Execute SQL for Current Component step of FIG. 8.

FIG. 9 is a flowchart of Generate and Execute SQL for Current Component step 830.

One of skill in the art will recognize that there are several possible approaches for generating SQL statements from a SQL integration object instance. For example, a flat denormalized data set can be created by doing a join for all tables corresponding to SQL integration component definitions of the SQL integration object definition, and a SQL statement could be generated for the denormalized data set. However, such an implementation would be unwieldy and would not take advantage of the relationships between the tables.

Alternatively, multiple SQL statements without joins can be created and executed, and the result sets joined. The second approach is preferred because a SQL statement is generated for each table, producing simpler code and allowing a variety of relationships to be represented. Furthermore, SQL statements incorporating joins are subject to variation in syntax and operational results, so that omitting joins within a SQL statement increases the ability to integrate data from a broader range of internal and external data sets.

With the second approach, one of skill in the art will also recognize that a hierarchical SQL integration object definition can be traversed according to either a breadth-first or a depth-first traversal. Because of the hierarchical nature of a parent/child relationship between tables, a depth-first traversal is preferred.

A new SQL statement is started for each SQL integration component definition in the SQL integration object definition corresponding to the QBE instance. In Start New Current Component SQL Statement step 910, a new SQL statement for the current component is begun.

In Search Spec Indicates All Records decision point 912, a determination is made whether all records are to be obtained from the table corresponding to the current component. For example, when the input data does not include a unique identifier for an instance of a given component, then the search specification indicates that all records from the corresponding table are to be obtained. When the search specification indicates all records, control proceeds to Generate SELECT Clause from Current Component for All Records step 920. For example, a SELECT clause such as SELECT field1, field2 from TABLE where TABLE is the table corresponding to the current component may be generated. The SQL integration fields to include, here field1 and field2, may be determined from the SQL integration object definition associated with the QBE instance. No WHERE clause is added to the SQL statement started for the current component so that all records are selected.

Note that selecting all records from the corresponding table produces a result set in which each record from the corresponding table may not have children records specified at a lower level of the SQL integration object instance in the input data. It is within the scope of the invention to later eliminate such "childless" records from the ultimate output data as appropriate for a given implementation of SQL adapter business service 110. For example, output data 109 provided as a result of Provide Output Data step 730 of FIG. 7 may exclude these childless records.

From Search Spec Indicates All Records decision point 912, control proceeds to Current Component is Child decision point 960.

At Search Spec Indicates All Records decision point 912, if all records are not indicated, a unique identifier for an instance of the current component is included in the input data and control proceeds to Generate SELECT from Current Component and WHERE clauses step 914. A SELECT clause such as that illustrated above is generated and a WHERE clause, comprising only the WHERE keyword, is concatenated to the SELECT clause. Control proceeds to Room for Another Selection Clause decision point 916, where a determination is made whether there is room for another selection clause in the current component SQL statement. This determination can be made, for example, by using the MaxSqlClauses parameter described above.

If, in Room for Another Selection Clause decision point 916, the current component SQL statement has reached its maximum length, control proceeds to Start New Current Component SQL Statement step 918. Control then returns to Generate SELECT from Current Component and Where Clauses step 914.

If, in Room for Another Clause decision point 916, there is room for another clause in the current component SQL statement, control proceeds to Select Unmarked Instance of Current Component as Current Instance step 930. A SQL integration component instance of the current component definition is selected from the input data. Control proceeds to Generate Selection Clause to Select Current Instance step 940. For example, a selection clause such as field1=2 may be generated.

In Concatenate Selection Clause to WHERE clause step 950, the selection clause is concatenated to the WHERE clause of the SQL statement. In the example above, the resulting SQL statement is given below:

---
SELECT field1, field2 from TABLE
WHERE field1 = 2
---

In Mark Current Instance step 952, the current instance in the input data is marked so that a selection clause for that instance will not be generated again.

Unmarked Instances in Search Spec decision point 955 determines whether additional unmarked instances of the current component appear in the input data. If so, control returns to Room for Another Selection Clause decision point 916.

If, for the example above, at this point there is room for another clause, an additional selection clause will be generated in Generate Selection Clause to Select Current Instance step 940, and the additional selection clause is concatenated to the WHERE clause in Concatenate Selection Clause to WHERE Clause step 950. For example, if the second selection clause were field1=3 the resulting SQL statement is given below:

---
SELECT field1, field2 from TABLE
WHERE field1 = 2 OR field1 = 3
---

Note that an OR operator is added between the two selection clauses when the second selection clause is concatenated.

If in Unmarked Instances in Search Specification decision point 955, no additional unmarked instances are in the input data, control proceeds to Current Component is Child decision point 960. Current Component is Child decision point 960 can also be reached directly from Generate SELECT clause from Current Component for All Records step 920.

In Current Component is Child decision point 960, a determination is made whether the current component is a child component. At this point, the SQL statement constructed thus far for the current component is referred to herein as the Current Component SQL Statement. If the current component is a child component, an additional parent selection clause is added to the Current Component SQL statement to restrict the selected records to only those that also have parent records selected in the parent component. This additional selection clause is added in Add Parent Selection Clause step 970, which is explained in further detail with reference to FIG. 10.

Control then proceeds to Unmarked Instances in Search Spec decision point 972. If unmarked instances remain in the input data, then the previous current component SQL statement exceeded a maximum length before selecting all instances. Control proceeds to Start New Current Component SQL Statement step 974, where a new SQL statement for the current component is begun to process the remaining instances. If no unmarked instances remain in Unmarked Instances in Search Spec decision point 972, Generate and Execute SQL for Current Component step 830 of FIG. 8 is complete and control proceeds to Mark Current Component as Complete step 840.

In Current Component is Child decision point 960, if the current component is not a child component, the Current Component SQL statement is executed. Generate and Execute SQL for Current Component step 830 of FIG. 8 is complete and control proceeds to Mark Current Component as Complete step 840.

Figure 10:
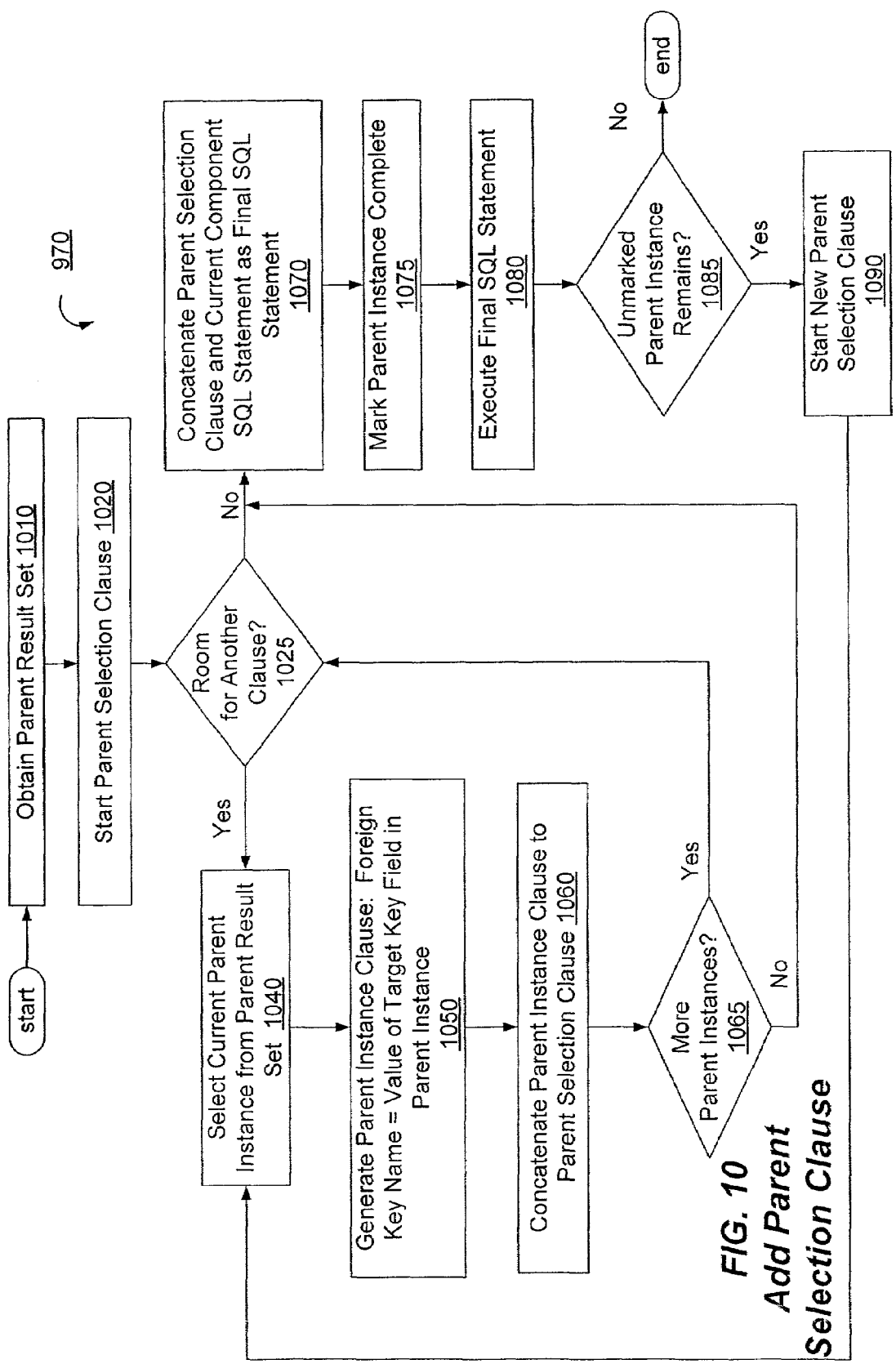
FIG. 10 is a flowchart of the Add Parent Selection Clause step of FIG. 9.

FIG. 10 is a flowchart of Add Parent Selection Clause step 970. This flowchart is described with reference to the following example. This example includes data corresponding to the SQL integration object definition 120*d* of FIG. 4.

Assume that the CUSTOMER table has at least the following records:

| Name   | Location  | State | Phone    | Org      |
| ------ | --------- | ----- | -------- | -------- |
| Peter1 | San Mateo | CA    | 673-9876 | Siebel   |
| Peter2 | Belmont   | CA    | 573-9873 | Allied   |
| Peter3 | Palo Alto | CA    | 373-9876 | BlueCross |
| Peter4 | Austin    | TX    | 273-9876 | Siebel   |

Assume that the input QBE instance for CUSTOMER has a search specification of "State=CA". The SQL statement for the CUSTOMER table is given below:

```
SELECT Name, Location, State, Phone, Org
FROM Customer
WHERE State = "CA"
```

This query will result in the first three Customer records shown above. Three CUSTOMER component instances are created and are referred to herein as Customer component instances 1, 2, and 3, respectively.

Also assume that the CONTACT table has the following records:

| ContactId | FirstName | LastName | CustName | CustLocation |
| --------- | --------- | -------- | -------- | ------------ |
| 1 | Peter | Fong | Peter1 | San Mateo |
| 2 | Mark  | Fong | Peter1 | San Mateo |
| 3 | Joe   | Fong | Peter2 | Belmont |
| 4 | Doug  | Fong | Peter4 | Austin |

Assume that the QBE instance includes a search specification of LastName=Fong for the CONTACT component. To construct the SQL statement for the CONTACT component, only children of the three selected customer records that also have a LastName value of Fong are of interest. The SQL statement constructed for the CONTACT component is given below:

```
SELECT ContactId, FirstName, LastName, CustName, CustLocation
FROM Contact
WHERE  LastName = Fong AND
       ((CustName = Peter1 AND CustLocation = San Mateo) OR
        (CustName = Peter2 AND CustLocation = Belmont) OR
        (CustName = Peter3 AND CustLocation = Palo Alto))
```

This query results in the first three records of the CONTACT table being fetched and corresponding CONTACT SQL integration object instances constructed, referred to herein as CONTACT component instances 1, 2 and 3, respectively. Note that the fourth record of CONTACT, which also indicates a LastName value of Fong, is not selected because its parent does not meet the CUSTOMER State specification of CA.

Each CONTACT SQL integration component instance is attached to its parent component instance. For example, CONTACT SQL integration component instances 1 and 2 are added as children of CUSTOMER SQL integration component instance 1. Contact SQL integration component instance 3 is added as a child of CUSTOMER SQL integration component instance 2. CUSTOMER SQL integration object instance 3 has no children CONTACT SQL integration component instances because no CONTACT records with a LastName of Fong are its children.

To illustrate the efficiencies made possible by the present invention, if the MaxSqlClauses parameter is specified as 2, then the following two SQL statements would be executed because only 2 parents can be grouped in one SQL statement.

```
SELECT ContactId, FirstName, LastName, CustName, CustLocation
FROM Contact
WHERE  LastName = Fong AND
       ((CustName = Peter1 AND CustLocation = San Mateo) OR
        (CustName = Peter2 AND CustLocation = Belmont))
```

This query would fetch the first three rows from the CONTACT table. The corresponding CONTACT SQL integration component instances are created and attached to their respective parent instances. Thereafter, another SQL statement is generated as follows:

```
SELECT ContactId, FirstName, LastName, CustName, CustLocation
FROM Contact
WHERE  LastName = Fong AND
       ((CustName = Peter3 AND CustLocation = Palo Alto))
```

No CONTACT records are retrieved, and no CONTACT SQL integration component instances are created.

Referring to FIG. 10, a flowchart providing steps for creating these SQL statements is given. In Obtain Parent Result Set step 1010, the result set generated by executing the SQL statement corresponding to the parent of the current component is obtained. Because a SQL integration object definition is traversed according to the steps of the flowchart of FIG. 8, SQL statements for a parent component are generated and executed prior to SQL statements for its children. Executing the SQL statements for the parent component produces the parent result set. Therefore, the parent result set is available at the time SQL statements for its children components are generated. In Start Parent Selection Clause step 1020, a new SQL clause specifically for selecting parent records is started. This parent clause is concatenated to the existing Current Component SQL statement. In the example given above, the Current Component SQL Statement appears as follows:

```
SELECT ContactId, FirstName, LastName, CustName, CustLocation
FROM Contact
WHERE    LastName = Fong
```

The parent selection clause is built incrementally by concatenating parent instance clauses to the WHERE clause of the Current Component SQL Statement. Therefore, at Room for Another Clause decision point 1025, a determination is made whether the Current Component SQL Statement has reached the maximum number of SQL clauses allowed. The maximum number of SQL clauses may be specified in the MaxSqlClauses parameter. If the Current Component SQL statement has reached its maximum length, control proceeds to Concatenate Parent Selection Clause and Current Component SQL Statement as Final SQL Statement step 1070.

If another SQL clause can be concatenated at Room for Another Clause decision point 1025, control proceeds to Select Current Parent Instance from Parent Result Step step 1040. A current parent instance is selected and control proceeds to Generate Parent Instance Clause: Foreign Key Name=Value of Target Key Field in Parent Instance step 1050. When generating the parent instance clause to be concatenated to the Current Component SQL Statement, the foreign key definition for the current component is used. Note that a particular component has only one foreign key definition, as a component can be a child of only one parent. The foreign key defined for the current component is set to a value of the target key field of the parent instance selected.

Control proceeds to Concatenate Parent Instance Clause to Parent Selection Clause step 1060. Control then proceeds to More Parent Instances decision point 1065, where a determination is made whether additional parent instances exist in the parent result set. If so, control returns to Room for Another Clause decision point 1025, discussed previously. If not, control proceeds to Concatenate Parent Selection Clause and Current Component SQL Statement as Final SQL Statement step 1070.

Referring back to the example above and FIG. 4, recall that the target key of the CUSTOMER TABLE is Name, Location and the foreign key of the CONTACT table is CustName, CustLocation. Also recall the following records in the CUSTOMER TABLE:

| Name | Location | State | Phone | Org |
|---|---|---|---|---|
| Peter1 | San Mateo | CA | 673-9876 | Siebel |
| Peter2 | Belmont | CA | 573-9873 | Allied |
| Peter3 | Palo Alto | CA | 373-9876 | BlueCross |
| Peter4 | Austin | TX | 273-9876 | Siebel |

In addition, recall the CONTACT children records:

| ContactId | FirstName | LastName | CustName | CustLocation |
|---|---|---|---|---|
| 1 | Peter | Fong | Peter1 | San Mateo |
| 2 | Mark | Fong | Peter1 | San Mateo |
| 3 | Joe | Fong | Peter2 | Belmont |
| 4 | Doug | Fong | Peter4 | Austin |

Assume that CUSTOMER SQL integration component instance 1 is selected as the parent instance. The parent selection clause generated is the following:

(CustName=Peter1 AND CustLocation=San Mateo)

and the resulting SQL Statement after concatenation in Concatenate Parent Instance Clause to Parent Selection Clause step 1060 is the following:

```
SELECT ContactId, FirstName, LastName, CustName, CustLocation
FROM Contact
WHERE    LastName = Fong AND
         (CustName = Peter1 AND CustLocation = San Mateo)
```

Assume that another iteration of steps 1040 through 1025 occurs, there is room for another clause, and an additional parent instance is selected. When CUSTOMER SQL integration component instance 2 is selected as the parent instance, the parent selection clause generated is the following:

(CustName=Peter2 AND CustLocation=Belmont)

and the resulting SQL statement after concatenation is the following:

```
SELECT ContactId, FirstName, LastName, CustName, CustLocation
FROM Contact
WHERE    LastName = Fong AND
         ((CustName = Peter1 AND CustLocation = San Mateo) OR
          (CustName = Peter2 AND CustLocation = Belmont))
```

Parent instance selection clauses are combined using OR to create the parent selection clause. The process of building the parent selection clause by adding parent instance selection clauses is repeated until a limitation of the length of the SQL statement is reached. As many parent instances are concatenated as possible so that fewer SQL statements retrieve all the desired records. In More Parent Instances decision point 1065, whether additional parent instances exists is determined. If so, control returns to Room for Another Clause decision point 1025, where the value of the MaxSqlClauses parameter is tested. If additional parent clauses do not exist, the parent selection clause is complete and control proceeds to Concatenate Parent Selection Clause and Current Component SQL Statement step 1070.

In Concatenate Parent Selection Clause and Current Component SQL Statement as Final SQL Statement step 1070, the parent selection clause is concatenated to the Current Component SQL Statement to form a final SQL statement to be executed. Control proceeds, to Mark Parent Instance Complete step 1075, where the parent instances included in the parent selection clause are marked as complete. This step is necessary because all parent instances may not be included in a single final SQL statement due to the MaxSqlClauses parameter, as illustrated with the two SQL statements in the example above. Control proceeds to Execute Final SQL Statement step 1080, where the final SQL statement is executed. Control proceeds to Unmarked Parent Instance Remains decision point 1085. If an unmarked parent instance remains, control proceeds to Start New Parent Selection Clause step 1090. Another final SQL statement will be generated from the new parent selection clause and the Current Component SQL Statement, which remained unchanged in the previous iteration of steps 1025 through 1090. Control then proceeds to Select Current Parent Instance from Parent Result Set step 1040, where an additional parent instance is selected.

If no unmarked parent instance remains in Unmarked Parent Instance Remains decision point 1085, Add Parent Selection Clause step 970 of FIG. 9 is complete. Generate and Execute SQL for Current Component step 830 of FIG. 8 is also complete, and control proceeds to Mark Current Component as Complete step 840.

Other parameters for query method 622 are shown in Table 1 below.

TABLE 1

| Parameter Name | Required? | Input/ Output | Data Type | Description |
| --- | --- | --- | --- | --- |
| NumOutputObjects | Yes | Output | Number | Number of Output SQL Integration Object Instances |
| OutputIntObjectFormat | No | Input | String | Output SQL Integration Object Definition defines the format |
| Message | Yes | Input/ Output | Hierarchy | Input/Output Property set should have a Message as its child. |

Upsert Method

Upsert method 624 does an insert or an update depending upon whether the data specified in input data 108 exists in a destination data set such as external database 140. To determine whether the data should be updated or inserted, user keys are used to search for the record in the destination data set.

Input data 108 for the upsert method can be the actual data as the data should appear in the destination data set, such as external database 140, in the hierarchical form of a SQL integration object instance. SQL adapter business service 110 optimizes the update or insertion of child record data for a particular parent component instance. This optimization uses the ratio of the number of children database rows in the destination data set related to the parent component instance to the number of SQL integration component instances that are children of the parent component instance in input data 108. This optimization is turned on by default.

A parameter called OptimizeUpsertOff is used to turn off the optimization. When optimization is turned off, upsert method 624 queries the data set for each SQL integration component instance 120*i* in input data 108. The upsert operation may be very expensive if the number of SQL integration component instances in the input is very large, but will be efficient if the number of rows in the database is very large compared to the number of SQL integration component instances in the input.

Upsert method 624 supports input in the form of multiple user key specifications to find the matching row in the database. If none of the user keys specified have all the fields set, an error is returned. A null value for any of the user key fields is valid.

Figure 11:
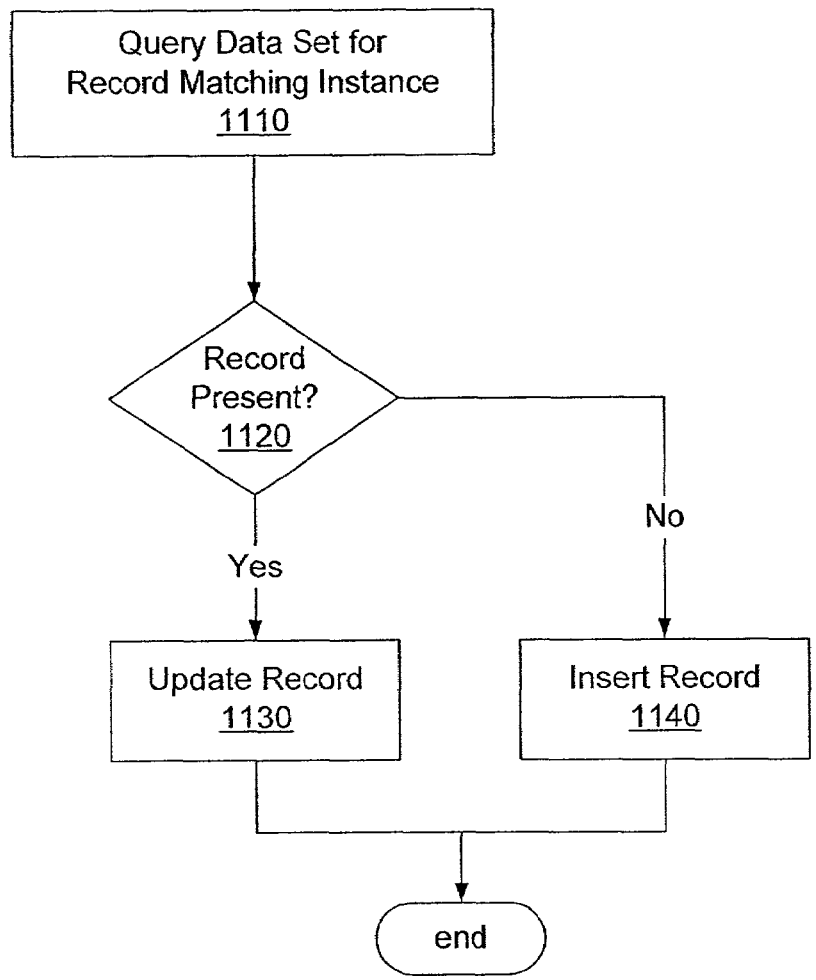
FIG. 11 is a flowchart of the upsert record operation.

FIG. 11 is a flowchart of the upsert record operation. In Query Destination Data Set for Record Matching Instance step 1110, the data set to be updated is queried using user keys to determine whether the record is present in the data set. In Record Present decision point 1120, a determination is made whether the record is present. If the record is present, the record is updated in Update Record step 1130. If the record is not present, in Insert Record step 1140, a record is inserted containing data corresponding to the input instance data.

Figure 12:
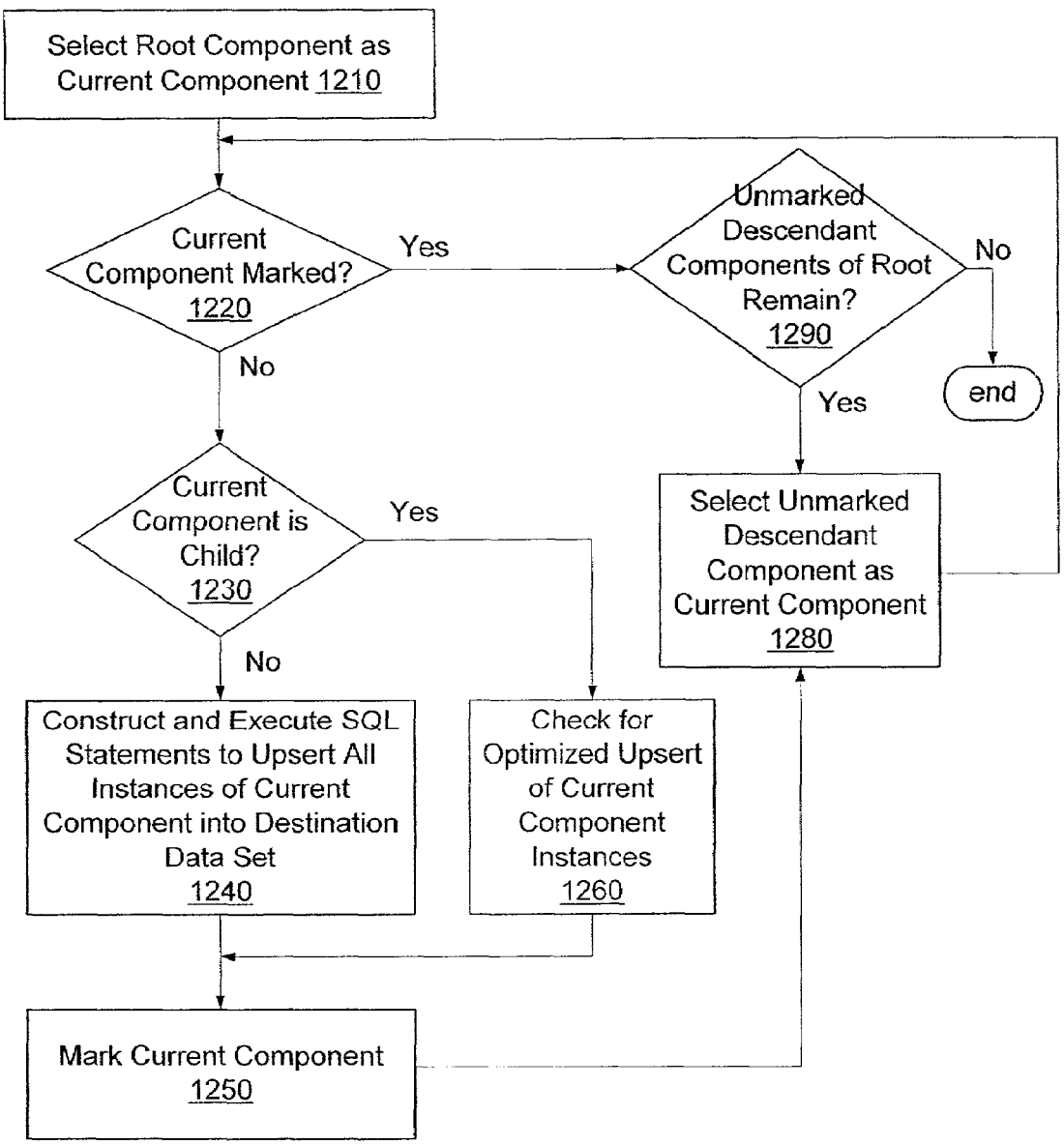
FIG. 12 is a flowchart of the upsert data set operation.

FIG. 12 is a flowchart of an upsert data set operation. An upsert of a data set corresponds to updating a destination data set with data from a source data set. Data present in the source data set that is not present in the destination data set is inserted into the destination data set. Values in the destination data set are replaced with values from the source data set. This flowchart illustrates an embodiment in which the OptimizeUpsertOff parameter is not set so that the upsert operation is optimized if possible.

In an upsert data set operation, the calling program such as calling program 105 provides a complete copy of the source data set to be upserted into the destination data set. In one embodiment, the source data are loaded into one or more SQL integration object instance by calling program 105. Calling program 105 provides instances of one SQL integration object definition for each invocation of SQL adapter business service 110 to perform an upsert data set operation.

In the embodiment of FIG. 12, in Select Root Component as Current Component step 1210, a root SQL integration component definition is selected. The SQL integration object definition is traversed beginning with the root component.

In Current Component Marked decision point 1220, a determination is made whether the current component is marked. If the current component is marked, data corresponding to the current component has already been upserted into the destination data set and control proceeds to Unmarked Descendant Components of Root Remain decision point 1290. If the current component is not marked, control proceeds to Current Component is Child decision point 1230.

In Current Component is Child decision point 1230, a determination whether the current component is the child of another component is made. All components in the hierarchy other than the root component have a parent component. When the current component is a child, control proceeds to Check for Optimized Upsert of Current Component Instances step 1260. Either an optimized upsert or a regular upsert is performed during the execution of Check for Optimized Upsert of Current Component Instances step 1260. Check for Optimized Upsert of Current Component Instances step 1260 is discussed further with regard to FIG. 13.

When the current component is not a child at Current Component is Child decision point 1230, control proceeds to Construct and Execute SQL Statements to Upsert All Instances of Current Component into Destination Data Set step 1240. For each current component instance, the procedure described in FIG. 11 is performed. Note that, in FIG. 11, one query of the destination data set is performed for each component instance in Query Destination Data Set for Record Matching Instance step 1110. Thus the upsert is not optimized.

Returning to FIG. 12, control then proceeds from Construct and Execute SQL Statements to Upsert All Instances of Current Component into Destination Data Set step 1240 to Mark Current Component step 1250.

Mark Current Component step 1250 can be reached from either Construct and Execute SQL Statements to Upsert All Instances of Current Component into Destination Data Set step 1240 or Check for Optimized Upsert of Current Component Instances step 1260. The current component is marked to indicate that corresponding records for the current component have been upserted into the destination data set. Control then proceeds to Select Unmarked Descendant Component as Current Component step 1280. An unmarked descendant component of the root component is selected as the current component and upsert SQL statements are generated and executed for the new current component.

Figure 13:
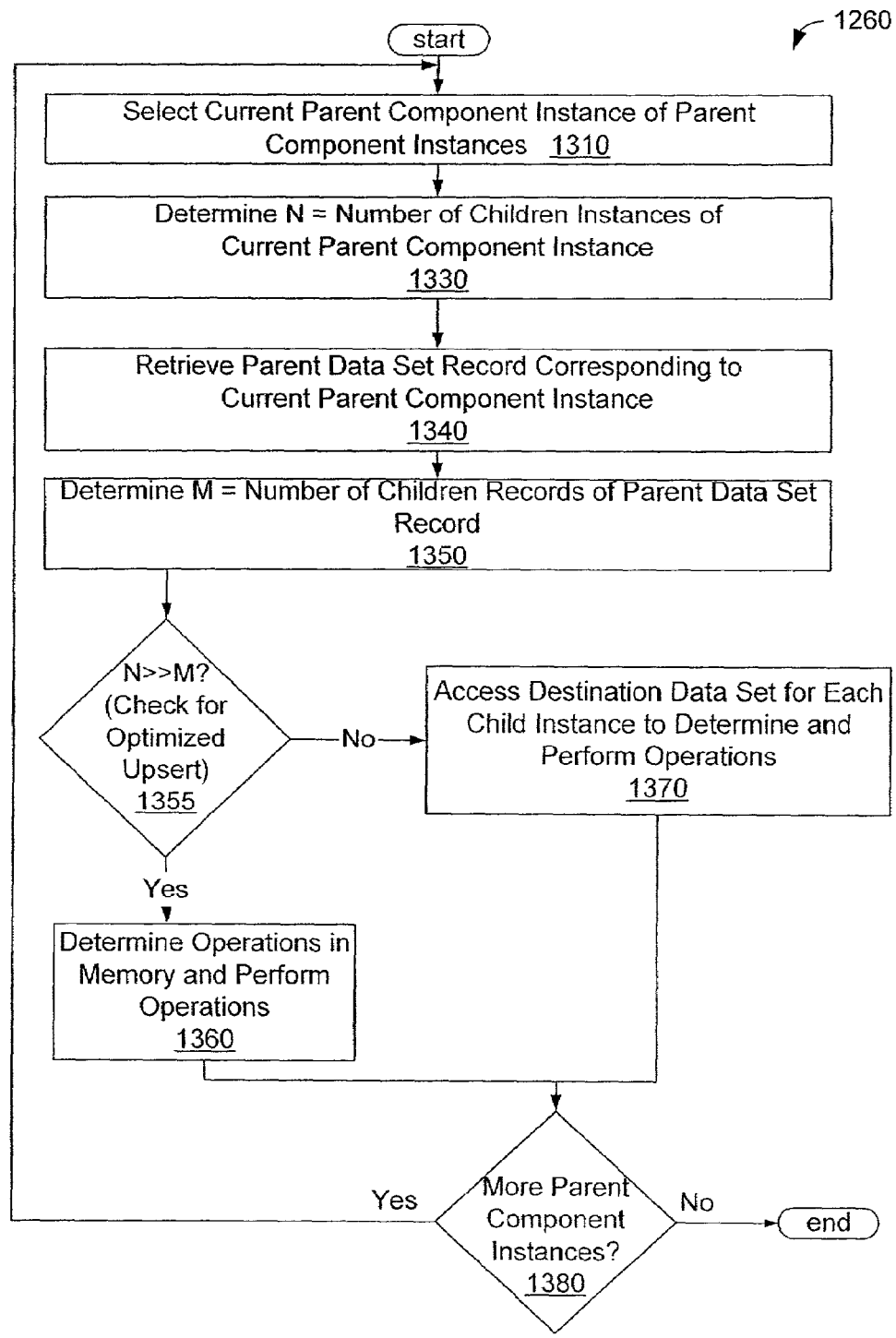
FIG. 13 is a flowchart of the Upsert Child Component step of the flowchart of FIG. 12.

FIG. 13 is a flowchart of Check for Optimized Upsert of Child Component Instances step 1260. In Select Current Parent Component Instance of Parent Component Instances step 1310, a current parent component instance is selected.

In Determine N=Number of Children Instances of Current Parent Component Instance step 1330, a value for N is calculated as the number of children instances of the current parent component instance. In Retrieve Parent Data Set Record Corresponding to Current Parent Component Instance step 1340, the data set record corresponding to the current parent component instance selected is retrieved.

In Determine M=Number of Children Records of Parent Data Set Record step 1350, a value for M is calculated as the number of children of the parent record retrieved. In N>>M decision point 1355, the values of N and M are compared. The symbol ">>" is used to indicate a "much larger" operator. In one embodiment, N is considered to be much larger than M when the ratio of N to M has a value of seven (7) or higher. The comparison of N and M determines provides the check whether the upsert operation can be optimized.

If N is much larger than M, control proceeds to Determine Operations in Memory and Perform Operations step 1360, where an optimized upsert operation is performed. Determine Operations in Memory and Perform Operations step 1360 is described in further detail with reference to FIG. 14A.

If the value of N is not much larger than M, control proceeds to Access Destination Data Set for Each Child Instance to Determine and Perform Operations step 1370. Access Destination Data Set for Each Child Instance to Determine and Perform Operations step 1370 is described in further detail with reference to FIG. 14B.

From either of Determine Operations in Memory and Perform Operations step 130 and Access Destination Data Set for Each Child Instance to Determine and Perform Operations step 1370, control proceeds to More Parent Component Instances decision point 1380.

If additional parent component instances remain, control returns to Select Current Parent Component Instance of Parent Component Instances step 1310. If no additional parent component instances remain, Check for Optimized Upsert of Child Component Instances step 1260 is complete and the upsert data set operation of FIG. 12 is complete.

Figures 14A, 14B:
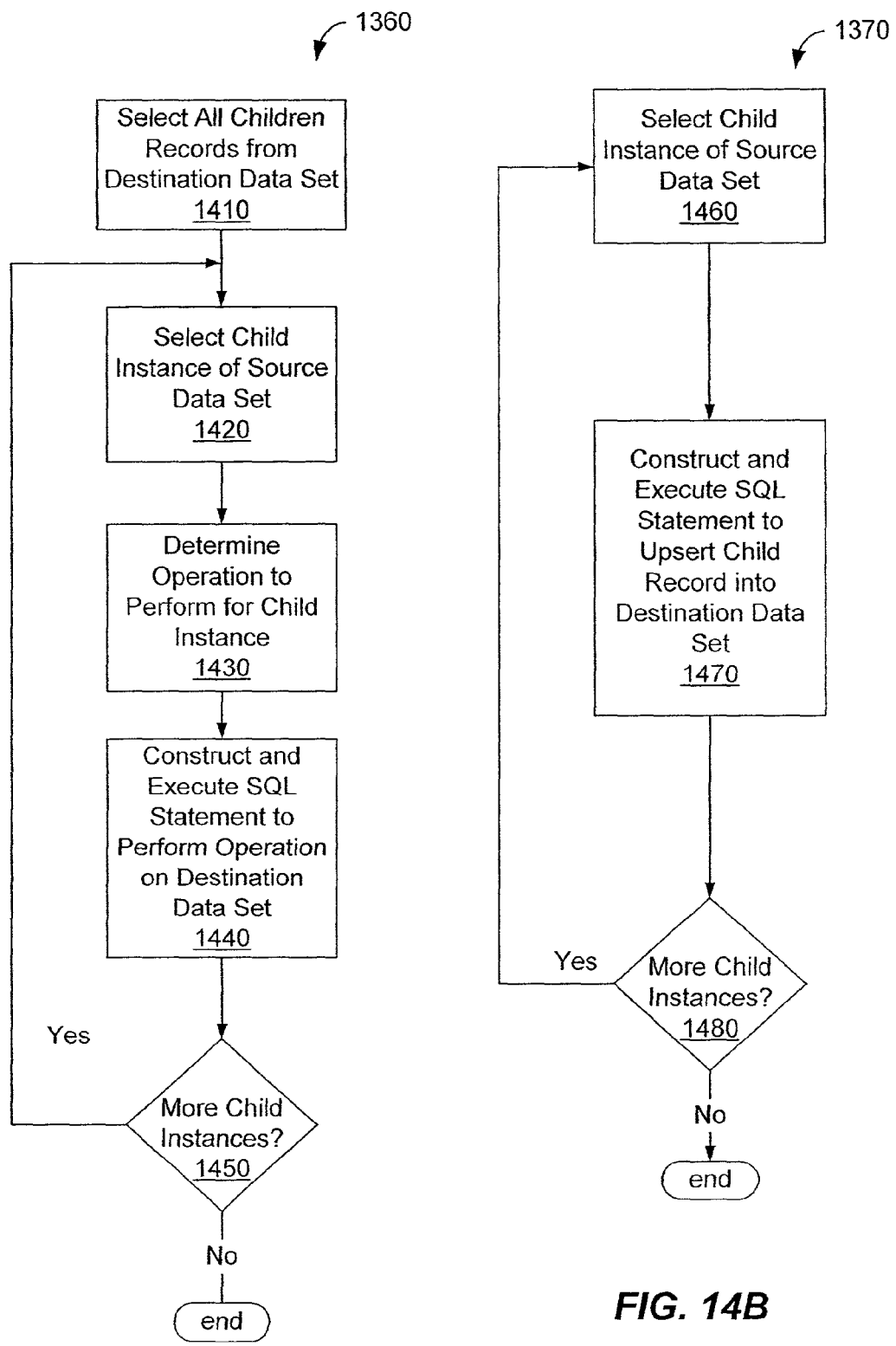
FIG. 14A is a flowchart of the Determine Operations in Memory and Perform Operations step of the flowchart of FIG. 13.
FIG. 14B is a flowchart of the Access Data Set to Determine and Perform Operations step of the flowchart of FIG. 13.

FIG. 14A is a flowchart of Determine Operations in Memory and Perform Operations step 1360. In Select All Children Records from Destination Data Set step 1410, a single SQL statement is used to retrieve all children records of the destination data set into memory. As a result, accesses of the destination data set are greatly reduced and the upsert operation is optimized.

In Select Child Instance of Source Data Set step 1420, a child instance of the source data set is selected from memory. Control proceeds to Determine Operation to Perform for Child Instance step 1430, where an in-memory test is made to determine whether a corresponding child record should be updated or inserted. Control proceeds to Construct and Execute SQL Statement to Perform Operation on Destination Data Set step 1440, where the child record is either updated or insert according to the operation determined. Control proceeds to More Child Instances decision point 1450, where a determination is made whether additional child instances exist in the source data set. If so, control returns to Select Child Instance of Source Data Set step 1320. If not, the Determine Operations in Memory and Perform Operations step 1360 is complete and control proceeds to More Parent Component Instances decision point 1380 of FIG. 13.

FIG. 14B is a flowchart of Access Destination Data Set for Each Child Instance to Determine and Perform Operations step 1370. The upsert operation is not optimized, and each child instance is processed individually. The test for insertion or update is performed by querying for each row in the destination data set that corresponds to each component instance in the source data set individually. As a result, every child instance in the source data set results in a SQL statement that accesses the data set.

In Select Child Instance of Source Data Set step 1460, a child instance of the source data set is selected. Control proceeds to Construct and Execute SQL Statement to Upsert Child Record into Destination Data Set step 1470, where a child record corresponding to the child instance is upserted (according to the upsert data record operation of FIG. 11). As described above, in Query Destination Data Set for Record Matching Instance step 1110 of FIG. 11, the data set to be updated is queried using user keys to determine whether the record is present in the data set. Control proceeds to More Child Instances decision point 1480, where a determination is made whether additional child instances in the source data set exist. If so, control returns to Select Child Instance of Source Data Set step 1460. If not, Access Destination Data Set for Each Child Instance to Determine and Perform Operations step 1370 is complete and control proceeds to More Parent Component Instances decision point 1380 of FIG. 13.

Additional parameters for the upsert method 624 are given in Table 2.

TABLE 2

| Parameter Name | Required? | Input/ Output | Data Type | Description |
| --- | --- | --- | --- | --- |
| Message | Yes | Input/ Output | Hierarchy | Input/Output Property set should have a message as its child. |

Delete Method

Delete method 626 takes a QBE instance as input and deletes the entire record hierarchy rooted at the specified root SQL integration component instance 122i. In one embodiment, a search specification identifying the data record to be deleted is only allowed at the root component level of an SQL integration object definition. If no search specification is given, all rows from the database table/view 204 corresponding to the root component are deleted. A Cascade_Delete component attribute, as shown in SQL integration component attribute 426 of FIG. 4, can be specified in SQL integration object definition 120d for each SQL integration component definition 122d. If the Cascade_Delete attribute is set, then a given instance of a child SQL integration component 122i is also deleted on deletion of its parent instance. As described above, parent/child relationships are ascertained by the foreign key and target key defined in SQL integration component key definition 126d.

FIG. 15 is a flowchart of the delete record hierarchy operation. Select Root Component Instance step 1505, a root component instance from the QBE instance is selected. While only a single integration object definition is provided as input data to the delete operation, more than one instance of the root component definition can exist in the input data. In Query Data Set for Root Record Matching Root Component Instance step 1510, a query of the destination data set is made for the root instance to be deleted. In Root Record Present decision point 1520, a determination is made whether the root record to be deleted exists in the destination data set. If no record is present, control proceeds to Another Root Component Instance decision point 1544.

If the root record is present in Root Record Present decision point 1520, control proceeds to Mark Root Record for step 1530. In the delete record hierarchy operation, records are marked and not deleted during traversal of the SQL integration object definition so that descendant component instances can be located to traverse. The root record is marked for deletion and control proceeds to Root Record has Children decision point 1540. If the root record had no children records, control proceeds to Delete Marked Records step 1542. If the root record had children, control proceeds to Select Current Descendant Component step 1545.

In Select Current Descendant Component step 1545, a descendant component of the root component is selected. Control proceeds to Cascade Delete Set decision point 1550. If the Cascade_Delete attribute is set, control proceeds to Mark Descendant Records of Parent Record for Delete step 1560 and the children records in the current descendant component are also marked for deletion. If the Cascade_Delete attribute is not set, control proceeds to Delete Marked Records step 1542.

In Mark Descendant Records of Parent Record for Delete step 1560, all descendants of the parent record present in the current descendant component are marked for deletion. Control proceeds to Another Descendant Component has Child of Root decision point 1570.

If, in Another Descendant Component has Child of Root decision point 1570, another descendant component of the root component has children records of the parent record, control proceeds to Select Current Descendant Component step 1545. If not, control proceeds to Delete Marked Records step 1542.

In Delete Marked Records step 1542, all records marked for deletion in all tables corresponding to component definitions of the SQL integration object definition are deleted. A separate SQL statement to delete marked records for each component is executed. Control proceeds to Another Root Component Instance decision point 1544.

If, in Another Root Component Instance decision point 1544, another root component instance exists, control returns to Select Root Component Instance step 1505 to select another instance of the root component definition. If not, the delete record hierarchy operation is complete.

Other parameters of delete method 626 are given below in Table 3.

TABLE 3

| Parameter Name | Required? | Input/Output | Data Type | Description |
| --- | --- | --- | --- | --- |
| Message | Yes | Input | Hierarchy | Child property set. |

Synchronize Method

Synchronize method 628 is used to ensure that the data in a first and second data set are the same. Synchronize method 628 is similar to the upsert method 624, except for the fact that deletes are performed on rows in the database that are not present in the input instance.

FIG. 16 is a flowchart of the synchronize data sets method. The source data set contains the data that are to be mirrored in the destination data set. In Query Source Data Set for All Records step 1610, all records are retrieved from the source data set. In Upsert Result Set into Destination Data Set step 1620, an upsert data set operation as described in FIG. 12 is performed. In Record in Destination Data Set not in Source Data Set decision point 1630, a determination is made whether any records that are in the destination data set are not in the source data set. If so, in Delete Record from Destination Data Set step 1540, the record is deleted, and control returns to Record in Destination Data Set not in Source Data Set decision point 1630. If no records in the destination data set remain that are not in the source data, the synchronize data sets operation is complete.

Execute Method

Execute method 630 enables multiple operations to be performed on a SQL integration component. Execute method 630 allows query, upsert, delete, and synchronize operations to be specified for a particular SQL integration object definition. If either "Synchronize" or "Delete" is specified for a SQL integration component definition, all operations specified for a descendant component of the current SQL integration component are invalid and are ignored.

Parameters for Execute method 630 are given below in Table 4.

TABLE 4

| Parameter Name | Required? | Input/Output | Data Type | Description |
| --- | --- | --- | --- | --- |
| Message | Yes | Input/Output | Hierarchy | Input/Output Property set should have a Message as its child. |

Reverse Query Method

In reverse query method 632, SQL adapter business service 110 can start with the primary key(s) of a component instance at any level of a hierarchy defined in a SQL integration object definition. Reverse querying obtains each ancestor component instance for the input instance up to the root component instance. Foreign key definitions are used to determine the parent component of each traversed component to perform the reverse query. Because each component definition in a SQL integration object definition can include only a single parent component definition, reverse query produces one record for each ancestor from the input component instance to the root.

Figure 17:
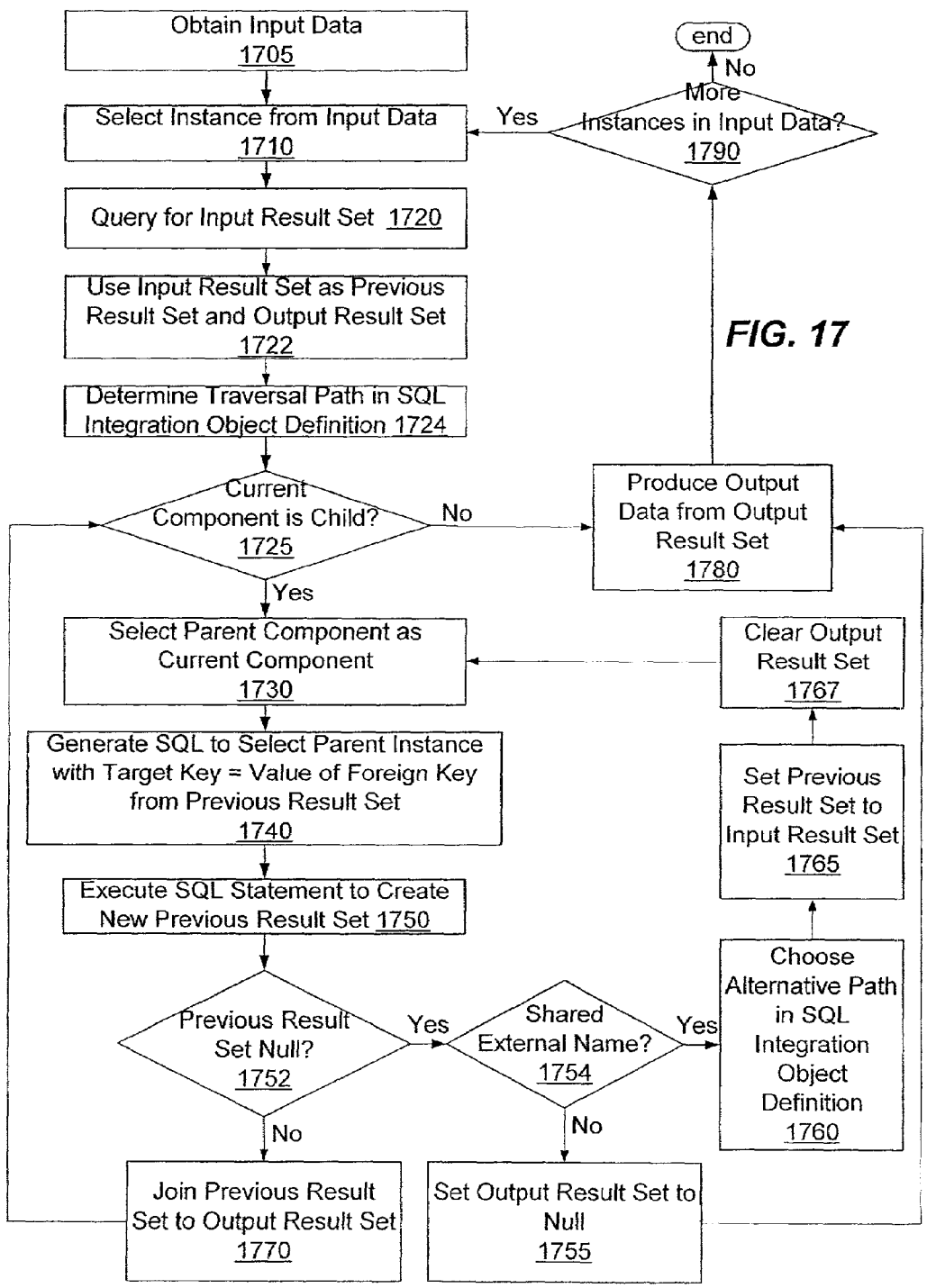
FIG. 17 is a flowchart of the reverse query operation.

FIG. 17 shows a flowchart of reverse query method 632. The operation of the flowchart is explained with reference to FIG. 18.

Figure 18:
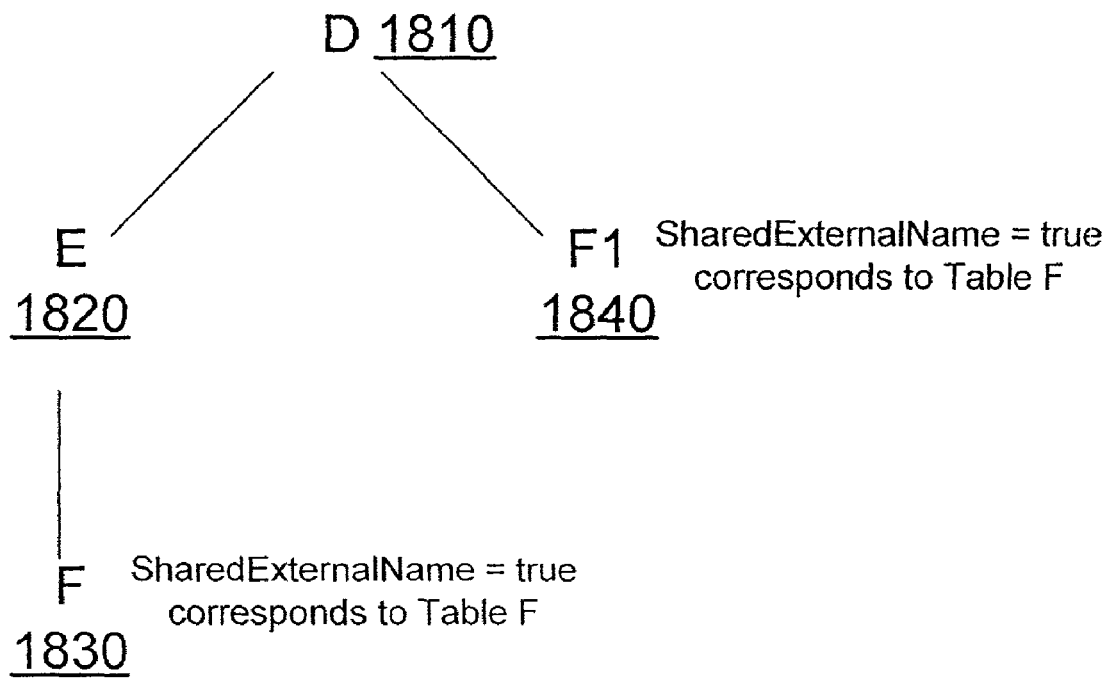
FIG. 18 is an example of a SQL integration object definition used to illustrate the flowchart of FIG. 17.

In FIG. 18, four component definitions are included, D 1810, E 1820, F 1830, and F1 1840. Component definitions F 1830 and F1 1840 correspond to the same physical table, table F. Example data for each of Tables D, E and F are given below.

TABLE D

| DID | Name |
|-----|------|
| 1 | Peter |
| 2 | Sam |
| 3 | Chris |

TABLE E

| EID | Color | DID (foreign key) |
|-----|-------|-------------------|
| 1 | Blue | 1 |
| 2 | Red | 1 |
| 3 | Yellow | 2 |
| 4 | Red | 2 |
| 5 | Green | 3 |
| 6 | Pink | 3 |

TABLE F

| FID | Country | DID (foreign key) | EID (foreign key) |
|-----|---------|-------------------|-------------------|
| 1 | USA | 1 | — |
| 2 | France | 1 | — |
| 3 | India | — | 1 |
| 4 | UK | — | 1 |
| 5 | Germany | — | 2 |

Referring to FIG. 17, in Obtain Input Data step 1705, input data (a QBE instance) is obtained for performing the reverse query. A search specification can be specified at any level of a SQL integration object definition. A search specification may include one or more values of a unique identifier for a SQL integration component definition; i.e., the search specification may include one or more primary key values for one or more records in a corresponding table. In the example shown in FIG. 18, the search specification includes unique identifier FID=5, which identifies a single record of Table F. The search specification for a reverse query may be provided as part of an SQL integration object instance in which the ancestor component instances are null. In one embodiment, if a single search specification instance includes unique identifiers at more than one level, the search specification of the lowest level component definition is used.

Because reverse query is a bottom-up traversal of the SQL integration object definition, it begins with the search specification. Thereafter, each query for an ancestor begins with the result set of the previous query, called a previous result set, to ensure that only relevant ancestor records are included in the output data.

In Select Instance from Input Data step 1710, the SQL integration object instance having FID=5 is selected.

In Query for Input Result Set step 1720, the selected instance is used to query the corresponding table, Table F. The following SQL statement is generated:

```
SELECT FID, Country, DID, EID
FROM Table F
WHERE FID = 5
```

All fields of the corresponding table are included in the query. The result set from the above example query produces a result set containing the fifth record from Table F, with the following values:

FID=5, Country=Germany, DID=NULL, EID=2

In Use Input Result Set as Previous Result Set and Output Result Set step 1722, the result set of the query based upon the search specification is designated as the previous result set for building the reverse query in a bottom-up traversal of the SQL integration object definition. The records from the input result set are also designated as the output result set for producing output data.

Foreign key values from the previous result set are used to build a query for the parent table to obtain the ancestor record of the selected instance. Table F includes two foreign keys, DID and EID. Therefore, two possible paths to the root are present from Table F. The first path is from component definition F1 1840 to root component definition D 1810. The second path is from component definition F1830 through component definition E 1820 to root component definition D 1810. In Determine Traversal Path in SQL Integration Object Definition step 1724, assume that foreign key DID is selected, identifying the first path to the root. The current component therefore corresponds to F1 1840.

In Current Component is Child decision point 1725, if the current component definition is a child of another component definition, control proceeds to Select Parent Component as Current Component step 1730. If the current component definition is not a child, it corresponds to a root of the SQL integration object definition and control proceeds to Produce Output Data from Output Result Set 1780.

In the example, the current component definition corresponds to F1 1840. Control proceeds to Select Parent Component as Current Component step 1730, and component definition D 1810 is selected. Control proceeds to Generate SQL to Select Parent Instance with Target Key=Value of Foreign Key from Previous Result Set step 1740.

The value of the foreign key in the previous result set corresponding to the current component, the NULL value of foreign key DID in the current example, is used to generate the following SQL statement for component definition D 1810:

```
SELECT DID, Name
FROM Table D
WHERE DID = NULL
```

In Execute SQL Statement to Create New Previous Result Set step 1750, the generated SQL statement is executed. In the example, because no records in Table D have a null DID, the previous result set from executing this SQL statement is null.

Previous Result Set Null decision point 1752 is related to a situation in which a given table corresponds to more than one SQL integration component definition in a SQL integration object definition. This situation may occur when the table appears as a child of more than one SQL integration component definition. For example, a commonly used table, such as the PHONE table of FIGS. 4 and 5, can be a child table of a number of different tables. While not shown in the example for FIG. 4, the PHONE table can be a child table of the CUSTOMER table as well as of the CONTACT table in the SQL integration object definition.

SQL adapter business service 110 uses a component attribute, such as SQL integration component attribute 123*d*, called "SharedExternalName" to handle this situation and improve efficiency. When a SQL integration component definition contains the "SharedExternalName" attribute, another SQL integration component definition in the same SQL integration object definition corresponds to the same external table (the same database table/view 204). For example, FIG. 18 shows that Table F resides in two paths to the root in the same SQL integration object definition, the path with leaf node corresponding to F 1830 and the path with leaf node corresponding to F1 1840. In performing a reverse query, SQL adapter business service 110 exhaustively tries to reach the root component for each path in the SQL integration object definition using the foreign keys that are defined for each component definition. After failure in a first attempt to produce a result of the reverse query, an alternative path is traversed when the SharedExternalName attribute is set.

In Previous Result Set Null decision point 1752, a determination is made whether the result set produced by Execute SQL Statement to Create New Previous Result Set step 1750 is null. A null result set indicates that no parent for the record was found, perhaps indicating that the instance belongs to another SQL integration component definition for the same table, rather than the current component definition. In the example, the result set is null.

When, in Previous Result Set Null decision point 1752, the result set is null, control proceeds to Shared External Name decision point 1754, where a determination is made whether the SharedExternalName attribute is set. As shown in FIG. 18, the SharedExternalName attribute is set for both component definitions F 1830 and F1 1840. Control proceeds to Choose Alternative Path in SQL Integration Object Definition step 1760. The path with leaf component definition F 1830 is selected as an alternative path beginning with Table F.

In Shared External Name decision point 1754, if the SharedExternalName attribute is not set, the reverse query did not produce a result, and control proceeds to Set Output Result Set to Null step 1755. Control then proceeds to Produce Output Data from Output Result Set step 1780, where a null SQL integration object instance, or possibly an error message, is produced as output data.

In Shared External Name decision point 1754, if the SharedExternalName attribute is set, control proceeds to Choose Alternative Path in SQL Integration Object Definition step 1760 to start again with the QBE instance to try another path to the root (i.e., another foreign key). In the example, the SharedExternalName attribute is set for component definitions F 1830 and F1 1840. Control proceeds to Choose Alternative Path in SQL Integration Object Definition step 1760. For the search specification of FID=5, the alternative path in the SQL integration object definition corresponds to the alternative foreign key EID. The alternate path, including component definitions D 1810, E 1820, and F 1830, is selected to be traversed.

From Choose Alternative Path in SQL Integration Object Definition step 1760, control proceeds to Set Previous Result Set to Input Result Set 1765. In Set Previous Result Set to Input Result Set 1765, the result set from the original search specification is used as a starting point. This result set in the example includes the following record:

FID=5, Country=Germany, DID=NULL, and EID=2

From Set Previous Result Set to Input Result Set step 1765, control proceeds to Clear Output Result Set 1767. In Clear Output Result Set step 1767, the output result set is cleared, as another path to the root is being traversed. Control returns to Select Parent Component as Current Component step 1730.

In this iteration for the example, the parent component of component definition F 1830 is component definition E 1820. The following SQL statement for table E is constructed from the previous result set:

SELECT EID, Color, DID FROM Table E
WHERE EID = 2

The result set of this query from the E table is the following:
EID=2, Color=RED, DID=1

The result set is not null, so in Previous Result Set Null decision point 1752, control proceeds to Join Previous Result Set to Output Result Set step 1770. The output result set now includes the following records:
EID=2, Color=RED, DID=1
FID=5, Country=Germany, DID=NULL, EID=2

Control then proceeds to Current Component is Child decision point 1725. Because component definition E 1820 is a child of component definition D 1810, control proceeds to Select Parent Component as Current Component step 1730. D 1810, the parent of component definition E 1820, is selected.

From the result set for component definition E 1820, the resulting SQL statement for component D 1810 is shown below:

SELECT DID, Name
FROM Table D
WHERE DID = 1

The result set for this SQL Statement includes the following record:
DID=1, Name=Peter When the new previous result set is created, control proceeds to Previous Result Set Null decision point 1752. Because the previous result set is not null, control proceeds to Join Previous Result Set to Output Result Set step 1770. The above result set for component definition D 1810 is joined with the output result set to produce the following records:
DID=1, Name=Peter
EID=2, Color=RED, DID=1
FID=5, Country=Germany, DID=NULL, EID=2

Control proceeds to Current Component is Child decision point 1725. Because component D 1810 is not a child component definition, control proceeds to Produce Output Data from Output Result Set step 1780. The output data for the example, in the form of an SQL integration object instance, includes the following data:
COMPONENT D 1810: DID=1, Name=Peter
COMPONENT E 1820: EID=2, Color=RED, DID=1
COMPONENT F 1830: FID=5, Country=Germany, DID=NULL, EID=2

By using a previous result set to construct a subsequent SQL statement, the number of records processed by each SQL statement is greatly reduced, thereby increasing efficiency of retrieving data from the data set.

Control then proceeds to More Instances in Input Data decision point 1790. In More Instances in Input Data decision point 1790, if additional instances remain, control proceeds to Select Instance from Input Data step 1710 and the reverse query is repeated to produce output data for another instance. In More Instances in Input Data decision point 1790, if no instances remain, the reverse query is complete. In the example, no instances remain, so the reverse query is complete.

Figure 19:
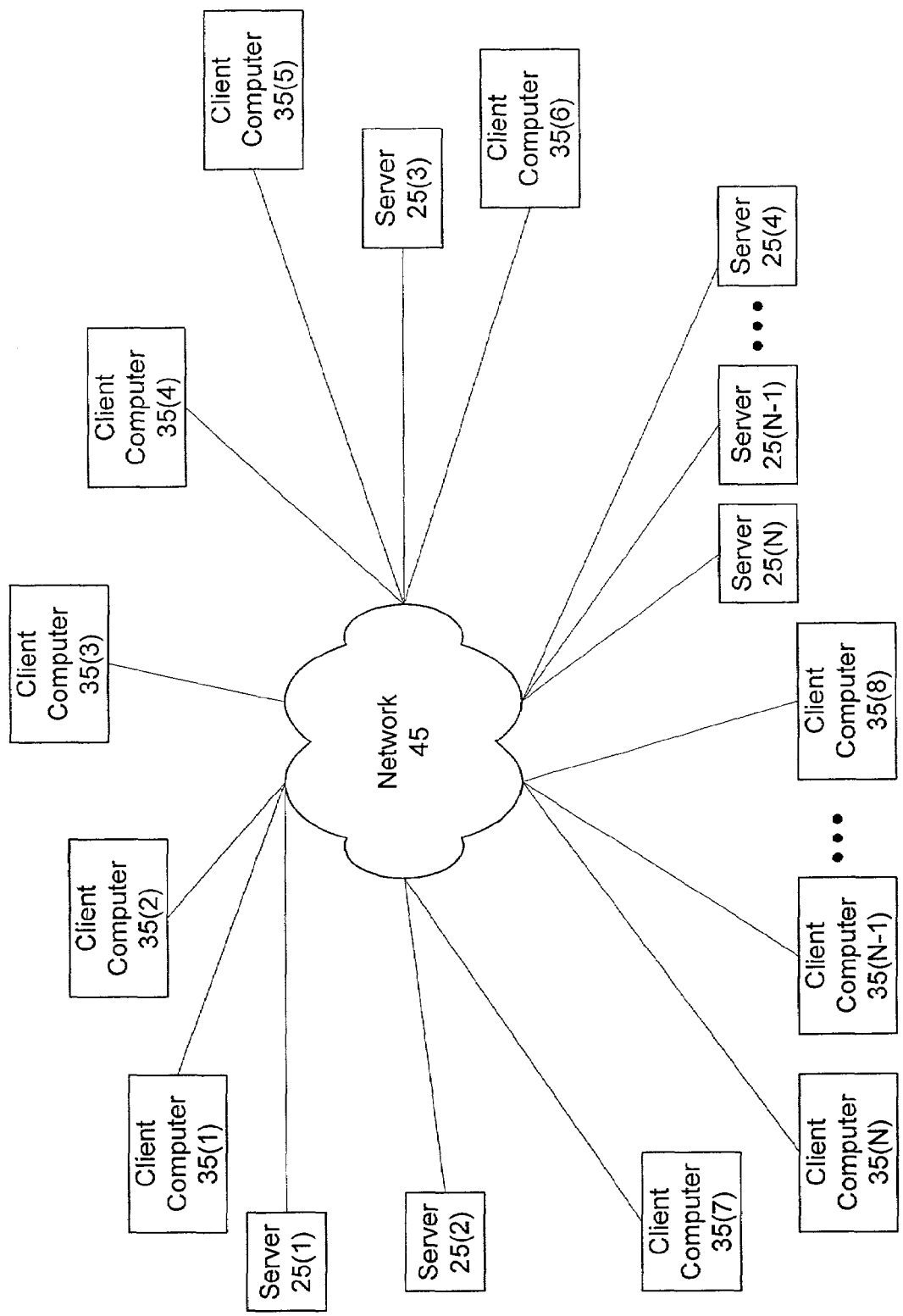
FIG. 19 is a block diagram illustrating a network environment in which a SQL adapter business service according to embodiments of the present invention may be practiced.

FIG. 19 is a block diagram illustrating a network environment in which system 100 according to the present invention may be practiced. As is illustrated in FIG. 19, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service). Client computers 35(1)-(N) access servers 25(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 35(1)-(N).

It will be noted that the variable identifier "N" is used in several instances in FIG. 5 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

One or more of client computers 35(1)-(N) and/or one or more of servers 25(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 35(1)-(N) is shown in detail in FIG. 20.

Figure 20:
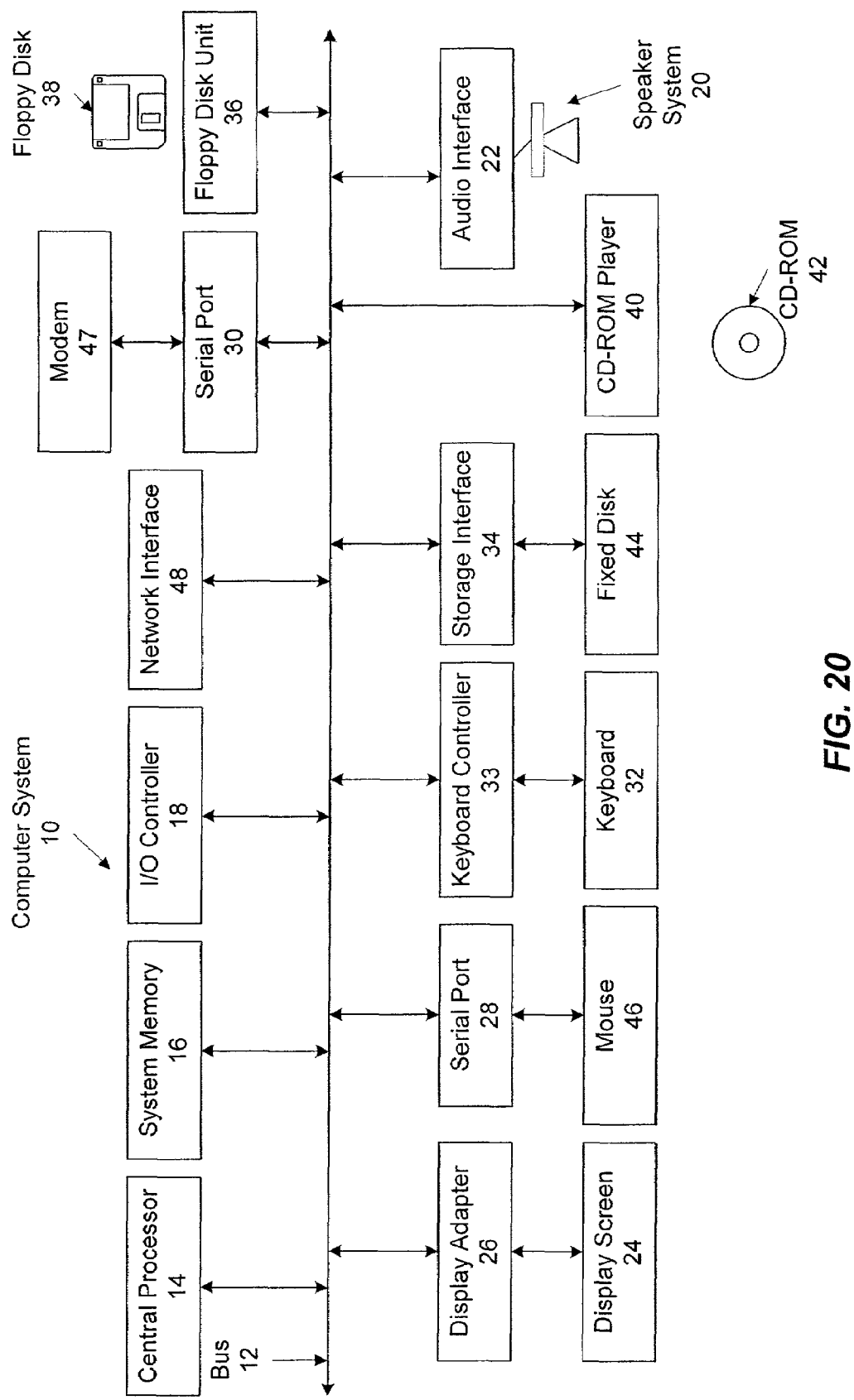
FIG. 20 is a block diagram illustrating a computer system suitable for implementing embodiments of the present invention.

FIG. 20 depicts a block diagram of a computer system 10 suitable for implementing the present invention, and example of one or more of client computers 35(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modern 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 20. The operation of a computer system such as that shown in FIG. 20 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliance, X-window terminal or other such computing device. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 21:
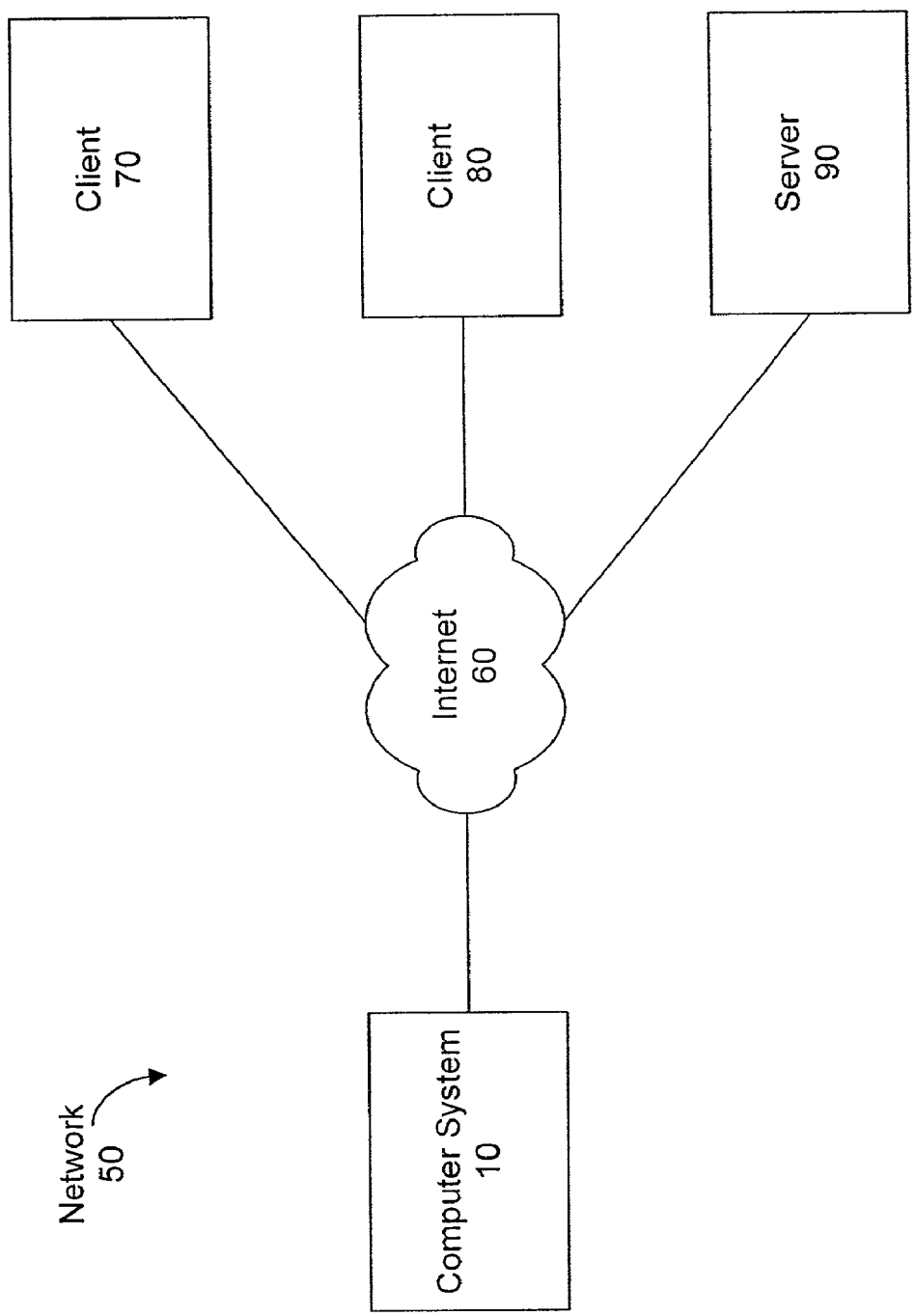
FIG. 21 is a block diagram illustrating the interconnection of the computer system of FIG. 20 to client and host systems.

FIG. 21 is a block diagram depicting a network 50 in which computer system 10 is coupled to an internet 60, which is coupled, in turn, to client systems 70 and 80, as well as a server 90. Internet 60 (e.g., the Internet) is also capable of coupling client systems 70 and 80 and server 90 to one another. With reference to computer system 10, modem 47, network interface 48 or some other method can be used to provide connectivity from computer system to internet 60. Computer system 10, client system 70 and client system 80 are able to access information on server 90 using, for example, a web browser (not shown). Such a web browser allows computer system 10, as well as client systems 70 and 80, to access data on server 90 representing the pages of a website hosted on server 90. Protocols for exchanging data via the Internet are well known to those skilled in the art. Although FIG. 21 depicts the use of the Internet for exchanging data, the present invention is not limited to the Internet or any particular network-based environment.

Referring to FIGS. 19, 20 and 21, a browser running on computer system 10 employs a TCP/IP connection to pass a request to server 40, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the HTML file using local resources (e.g., fonts and colors).

An advantage of the present invention is that the SQL adapter business service can communicate with various internal and external systems independently of the native format in which those systems maintain and store data. The SQL adapter business service optimizes operations to update data in the data sets by combining operations when possible and by using result sets from executing previous SQL statements to construct subsequent SQL statements. SQL adapter business service takes advantage of parent/child relationships between tables to construct SQL statements in an order such that the SQL statements process only a minimum amount of data, thereby making retrieval of data as efficient as possible.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiment shows different components contained within other components (e.g., the various elements shown as components of computer system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention.

Consequently, the invention is intended to be limited only by the spirit and scope of the appended claims, giving full cognizance to equivalents in all respects.

What is claimed is:

1. A computer-implemented method for using business data comprising:
   obtaining an operation to be performed on a data set and corresponding input data, wherein the operation comprises a synchronize operation;
   constructing one or more SQL statements to perform the operation on the data set according to the input data, wherein
      the input data comprises a hierarchical SQL integration object definition, wherein the hierarchical SQL integration object definition comprises:
         a SQL integration component definition, wherein the SQL integration component definition comprises a component type unique to the SQL integration component definition, and the component type corresponds to a table/view name corresponding to a root database table/view of a hierarchy of SQL integration component definitions,
         a SQL integration component key definition, wherein the SQL integration component key definition comprises a key field definition to accommodate composite keys, and the SQL integration component key definition comprises a key type, and
         the one or more SQL statements are constructed according to the input data by virtue of the one or more SQL statements being based upon the hierarchical SQL integration object definition, entire SQL integration object definition is traversed starting at the root component definition to construct the one or more SQL statements;
   executing the one or more SQL statements begins with the root component of the SQL integration object definition and traverses children components and then sibling components;
   executing each SQL statement of the one or more SQL statements on the data set once the each SQL statement is constructed, wherein
      the each SQL statement is executed prior to constructing a subsequent SQL statement of the one or more SQL statements, and
      the construction of the subsequent SQL statement of the one or more SQL statements depends on a result set of executing a prior SQL statement of the one or more SQL statements; and
   synchronizing the input data and the data set using the one or more SQL statements.

2. The method of claim 1 wherein
the prior SQL statement of the one or more SQL statements is executed before the subsequent SQL statement of the one or more SQL statements.

3. The method of claim 1 wherein
the operation comprises a query operation.

4. The method of claim 1 wherein
the operation comprises a reverse query operation.

5. The method of claim 1 wherein
the operation comprises a delete record hierarchy operation.

6. The method of claim 1 wherein
the operation comprises an upsert operation.

7. A computer system comprising:
a memory, wherein
   the memory comprises instructions; and
a processor, wherein
   the processor executes the instructions comprising:
obtaining instructions to obtain an operation to be performed on a data set and corresponding input data, wherein the operation comprises a synchronize operation;
constructing instructions to construct one or more SQL statements to perform the operation on the data set according to the input data, wherein
   the input data comprises a hierarchical SQL integration object definition, wherein
   the hierarchical SQL integration objects definition comprises:
      a SQL integration component definition, wherein the SQL integration component definition comprises a component type unique to the SQL integration component definition, and the component type corresponds to a table/view name corresponding to a root database table/view of a hierarchy of SQL integration component definitions,
      a SQL integration component key definition, wherein the SQL integration component key definition comprises a key field definition to accommodate composite keys, and the SQL integration component key definition comprises a key type, and
      the one or more SQL statements are constructed according to the input data by virtue of the one or more SQL statements being based upon the hierarchical SQL integration object definition, entire SQL integration object definition is traversed starting at the root component definition to construct the one or more SQL statements;
executing instructions to execute the one or more SQL statements begins with the root component of the SQL integration object definition and traverses children components and then sibling components;
executing instructions to execute each SQL statement of the one or more SQL statements on the data set once the each SQL statement is constructed, wherein
   the each SQL statement is executed prior to constructing a subsequent SQL statement of the one or more SQL statements, and
   the constructing instructions comprise subsequent constructing instructions to construct the subsequent SQL statement of the one or more SQL statements depending on a result set of executing a prior SQL statement of the one or more SQL statements; and synchronizing instructions to synchronize the input data and the data set using the one or more SQL statements.

8. The computer system of claim 7 wherein the prior SQL statement of the one or more SQL statements is executed before the subsequent SQL statement of the one or more SQL statements.

9. A computer program product comprising:

computer instructions comprising:

obtaining instructions to obtain an operation to be performed on a data set and corresponding input data, wherein the operation comprises a synchronize operation;

constructing instructions to construct one or more SQL statements to perform the operation on the data set according to the input data, wherein the input data comprises a hierarchical SQL integration object definition, wherein the hierarchical SQL integration objects definition comprises:

a SQL integration component definition, wherein the SQL integration component definition comprises a component type unique to the SQL integration component definition, and the component type corresponds to a table/view name corresponding to a root database table/view of a hierarchy of SQL integration component definitions, a SQL integration component key definition, wherein the SQL integration component key definition comprises a key field definition to accommodate composite keys, and the SQL integration component key definition comprises a key type, and the one or more SQL statements are constructed according to the input data by virtue of the one or more SQL statements being based upon the hierarchical SQL integration object definition, entire SQL integration object definition is traversed starting at the root component definition to construct the one or more SQL statements;

executing instructions to execute the one or more SQL statements begins with the root component of the SQL integration object definition and traverses children components and then sibling components;

executing instructions to execute each SQL statement of the one or more SQL statements on the data set once the each SQL statement is constructed, wherein the each SQL statement is executed prior to constructing a subsequent SQL statement of the one or more SQL statements, and the constructing instructions comprise subsequent constructing instructions to construct the subsequent SQL statement of the one or more SQL statement depending on a result set of executing a prior SQL statement of the one or more SQL statements;

synchronizing instructions to synchronize the input data and the data set using the one or more SQL statements; and a computer-readable medium to store the obtaining instructions, the constructing instructions, the executing instructions, and the synchronizing instructions.

10. The computer program product of claim 9 wherein the prior SQL statement of the one or more SQL statements is executed before the subsequent SQL statement of the one or more SQL statements.

* * * * *

UNITED STATES PATENT AND TRADEMARK OFFICE
CERTIFICATE OF CORRECTION

PATENT NO. : 7,552,135 B2 Page 1 of 1
APPLICATION NO. : 10/001095
DATED : June 23, 2009
INVENTOR(S) : Arjun Chandrasekar Iyer et al.

It is certified that error appears in the above-identified patent and that said Letters Patent is hereby corrected as shown below:

In column 5, line 26, delete "more," and insert -- more --, therefor.

In column 5, line 66, delete "conforming," and insert -- conforming --, therefor.

In column 14, line 19, delete "net" and insert -- not --, therefor.

In column 21, line 3, delete "proceeds," and insert -- proceeds --, therefor.

In column 33, line 41, delete "system to" and insert -- system 10 to --, therefor.

In column 38, line 20, in claim 9, delete "statement" and insert -- statements --, therefor. (2nd Occurrence)

Signed and Sealed this

Sixth Day of July, 2010

David J. Kappos
*Director of the United States Patent and Trademark Office*